US005733592A

United States Patent [19]

Wettstein et al.

[11] Patent Number: 5,733,592

[45] Date of Patent: Mar. 31, 1998

[54] METHOD FOR CLEANING AND SORTING BULK MATERIAL

[75] Inventors: Arthur Wettstein, Oberuzwil; Gilbert Moret, Henau, both of Switzerland

[73] Assignee: Bühler AG, Uzwil, Switzerland

[21] Appl. No.: 653,103

[22] Filed: May 24, 1996

Related U.S. Application Data

[63] Continuation of Ser. No. 160,497, Dec. 1, 1993, abandoned.

[30] Foreign Application Priority Data

Dec. 2, 1992 [CH] Switzerland ........................ 03 701/92
Mar. 4, 1993 [DE] Germany .......................... 43 06 703.4

[51] Int. Cl.[6] ........................................ A23L 1/025

[52] U.S. Cl. .......................... 426/416; 426/450; 426/482; 209/577; 209/580; 209/586; 209/939; 241/9; 241/24.1; 241/24.16; 241/24.26; 348/130; 356/394

[58] Field of Search ................................ 426/416, 443, 426/450, 482; 241/9, 11, 24.1, 26, 30, 33, 34, 36, 37, 226, 277, 230–233, 68, 76–79, DIG. 38, 24.16, 24.26, 24, 25; 209/577, 580–582, 586, 587, 939; 356/394, 407, 425; 348/129, 130

[56] References Cited

U.S. PATENT DOCUMENTS

| | | | |
|---|---|---|---|
| 3,097,744 | 7/1963 | Hutter et al. | 209/577 X |
| 3,399,839 | 9/1968 | Anderson et al. | 241/11 |
| 4,143,770 | 3/1979 | Grimmell et al. | 209/577 X |
| 4,352,430 | 10/1982 | Maier et al. | 209/577 |
| 4,624,367 | 11/1986 | Shafer et al. | 209/577 |
| 4,905,917 | 3/1990 | Fetzer et al. | 241/30 |
| 4,946,046 | 8/1990 | Affleck et al. | 209/580 |
| 5,031,845 | 7/1991 | Gemsjager | 241/78 |
| 5,158,237 | 10/1992 | Wellman | 241/9 X |
| 5,305,894 | 4/1994 | McGarvey | 209/580 |
| 5,379,949 | 1/1995 | Massen et al. | 241/30 |

FOREIGN PATENT DOCUMENTS 0475121 3/1992 European Pat. Off. .

*Primary Examiner*—Milton Cano
*Attorney, Agent, or Firm*—Martin A. Farber

[57] ABSTRACT

For cleaning foodstuffs in the form of a bulk material, such as cereal grains, rice grains, soybeans, sunflower seeds, coffee beans, and the like, there is provided an optical sorting device (24, 24*a*, 24*a*') subsequent to a precleaning system (6), which enables sorting on the basis of color and/or size and/or shape. Each particle of the bulk material is allocated to a particle class determined by parameters and conveyed on a supporting surface transporting the bulk material to a reception area (43, 44, 45) for the respective particle class. To clean the bulk material, impurities and bad particles are sorted out of the product, with the product being partitioned into classes, if required.

18 Claims, 15 Drawing Sheets

METHOD FOR CLEANING AND SORTING BULK MATERIAL

RELATED APPLICATION

This application is a continuation of our application Ser. No. 08/160.497 filed Dec. 1, 1993 now abandoned.

FIELD OF THE INVENTION

The invention relates to a method for cleaning by separating or sorting bulk material in the form of foodstuffs, such as cereal grains, rice grains, soybeans, sunflower seeds, coffee beans and the like, with the cleaning and sorting being provided within the scope of preparing these foodstuffs for further treatment. After a precleaning and a first cleaning, cereal grains are soaked, scoured and then ground to flour in a mill, preferably by means of a flour roller mill. In the case of rice grains, after a precleaning, there is provided a first cleaning followed by a grinding step. The first cleaning comprises the removal of impurities, a husking step and the removal of husks and undesired rice grains. The ground rice grains freed from grinding dust are preferably partitioned into various size classes. Oil seeds, such as soybeans and sunflower seeds, are subjected to a first cleaning after a precleaning, and then preferably pass treatment steps for manufacturing oil. In the case of sunflower seeds, the first cleaning is preferably provided after a husking step, so that impurities and husk particles are thereby removed. Also in the case of coffee there is provided a first cleaning following a husking step after a precleaning. Thereafter, the coffee beans are sorted according to size and quality.

BACKGROUND OF THE INVENTION

Cereals, rice, oilseeds, coffee and the like are harvested as natural products in great quantities, thus naturally being subjected to a certain contamination by impurities. The contaminations include impurities, such as parts of metal, glass, wood and plants as well as strings and stones having substantially larger dimensions, or, in the case of dust and sand, substantially smaller ones than those of the desired product particles. These impurities ought to be substantially removed in the precleaning phase by employing sizing screens, such as centrifuging or vibrating sieves and/or drum sieves. On the other hand, the contamination also includes degenerated particles or particles infested with pests and/or husks of the product to be processed, as well as seeds or stones having about the same size as the desired product particles. This share of the contamination is generally sorted out in the first cleaning by means of a plurality of machines. This classification takes place according to characteristic properties distinguishing the product from the contamination. The characteristic properties and devices separating according to these characteristic properties are essentially the following ones:

size by means of sieve density by means of wind sifter shape by means of indented surface separators Of course, a corresponding number of machines are allocated to the different sorting methods, with a plurality of such machines, and/or combination machines, e.g. combining sieve classification and aspiration or air classification, being provided for each sorting criterium, if required. This does not only lead to great capital investment but also to corresponding expenses for operational energy and space requirement. If the differences in size, density and shape between the bad particles and the desired particles are just small, a satisfactory separation cannot even be accomplished with a great expenditure of machinery. For example, small unhusked rice grains or rice grains discolored black cannot be sorted out from the husked, non-discolored rice grains.

It is the object of the present invention to decrease the expenditure of costs, energy and space and to improve the sorting or cleaning quality.

SUMMARY OF THE INVENTION

This aim is achieved according to the invention by subjecting the bulk material to an optical sorting during the first cleaning and, if required, already during the precleaning; in the case of oil seeds this is alternatively done after this cleaning, if necessary.

With this optical sorting, there are detected at least one of the characteristic properties of color, size and shape. After evaluating the color, size and/or shape information, the classification of the impurities or bad particles and/or the sorting into various classes will take place. The cleaning of bulk material and the optical color sorting are known independently from each other. However, it can now be seen that the use of color sorting for the cleaning, and particularly the combination of color sorting with optical size and/or shape sorting for the cleaning, leads to a substantial improvement over the methods known. For example, in the case of rice, a partitioning or sorting into rice grains with husks, rice grains without husks, husks, rice grains with black spots, green rice, broken rice and rice grains of different sizes is meaningful, becoming possible only by means of the method according to the invention.

The teaching provided by the invention is based on the recognition that judgment via the human eye is very reliable and that, therefore, an optical detection, in conjunction with an evaluation device deducing size and/or shape and/or color information and comparing this information with values characterizing the classification classes, will perform the cleaning or sorting task very well with respect to quality, but at the same time also at a lower expenditure of machinery, costs, energy and space. In fact, tests have shown that by means of optical sorting substantially all impurities, product particles infested with pests and, if necessary, undesired particles of the product; such as husks, can be sorted out.

If all particles of the product stream are detected optically for separating impurities, the additional expenditure for sorting the desired product into product classes on the basis of size and/or shape and/or color will be very low. Thus, the product, such as rice and coffee, can be partitioned into different quality classes. The optical sorting has the further advantage that the sharp grading can be utilized for optimizing the method. For example, husking devices can be optimally adjusted for a partial range of the particle size distribution and be fed by the optical sorting device only with particles having this partial range.

An optimum separation between desired and undesired particles will be achieved if the sorting takes place both according to color and according to size and shape, if required. The size is preferably characterized by at least one value corresponding to a particle extension (length) or a particle diameter and/or to at least one value corresponding to a particle section or plane of projection. Shape information includes at least one actual particle contour and/or at least one derived value, such as the first, the second and/or the third surface moment of a plane of projection.

The values characterizing the sorting classes or the particle classes are preferably detected within the scope of a learning run by evaluating the image information of at least one particle representative of the respective particle class or, if required, in the case of size and/or shape parameters, they are input as standard values with tolerance ranges, if necessary.

Since the optical sorting device ordinarily comprises a separating device, a supporting surface carrying or holding the individualized particles and a sorting device or an expeller, which elements are provided for a preset particle size spectrum, the product must not contain any impurities lying beyond the preset spectrum. If the product contains impurities not lying within the preset spectrum, the product has to be subjected to a precleaning, preferably by means of vibrating and/or drum sieves and/or wind sifters sorting out the particle shares being too large and/or the ones being too small, thus ensuring the operability of the optical sorting device.

A preferred embodiment of the invention is characterized by designing the optical sorting system with at least one optoelectronic sensor, preferably with a line array camera, but, if required, with a matrix color television camera, whose output signals are subjected to an electronic data processing for evaluating the quality of the grinding material, which data processing particularly represents a comparison procedure between the parameters of at least one sample particle and a respective particle from the bulk material or, if required, a readout of a table information, and which provides a result signal which is used for an independent control of the sorting device for the product particles. These steps enable an exact evaluation of the characteristic properties or parameters with respect to the required quality of the product or the particles. For evaluation criteria comprising the optical particle properties, which are only visible upon radiation with and/or upon receiving radiation from outside the visible range, such as infrared or ultraviolet, there are to be provided radiation sources and/or cameras within the respective wave range.

A further advantage of the optical sorting device over separating devices comprising mechanical pockets, e.g. sieves, or, as in the case of indented surface separators, accommodating product particles, is the distinctly smaller wear. The separation by means of sieves requires the particles to move over the sieve surface such that all particles come to lie at least once directly onto a sieve opening. The intense particle movement over the sieve surface leads to the undesired sieve wear and thus to increased maintenance work, and, in the case of sieve exchanges, to operational interruptions. The respective sieve wear may lead to wear of the product itself and thus to an impairment of the product quality, as well as to the development of product dust to be removed. The optical separation is a separation which is easy on the product and therefore, it can also be applied with sensitive products, In the case of an optical classification or sorting device, a change of the classification limits is very easy, since no machine parts have to be exchanged, but merely the size and/or shape and/or color values or previously established tables characterizing the classes to be sorted out. By means of electronic control measures, such as adjustments and automatic corrections, a change of the classification limits during operation can be avoided. This ensures a constant product quality even during long operational phases. In the case of mechanical separation devices, the adjustment of the classification limits involves the exchange of sieves and/or parts of indented surface separators, and, in the case of wind sifters, the adjustment of the proper air current. The right selection of the values influencing the separation calls for an experienced operator and, if required, for costly tests. In addition, the classification limits may change during operation due to an increasing contamination of the separation devices by product dust.

Furthermore, the invention relates to a method for sorting particles of a bulk material or a similar mass-product article, which is sorted out on a supporting surface of a sensor of an image analyzing device, with the sorting procedure taking place by means of energy introduced via an actuating unit onto the particle to be sorted out, as well as to a sorting device for carrying out the method.

In EP-A-475 121, there is described an image evaluation system with the help of which a granular material can be determined with respect to color and/or size or shape, with the above system comprising actuating units, such as air blast nozzles, by means of which the material can be sorted. In this patent specification it is said that in an operating cycle the granular material is to be sorted according to different characteristic properties, for which purpose the number of actuating units to be provided practically corresponds to the one of the sorting criteria. On the one hand, this results in considerable expenses for actuating units, on the other hand, also in certain space requirements. In addition, the energy introduced by the respective actuating units onto the particle to be sorted out remains substantially the same during the whole procedure. As long as there are particles having low size differences, and thus very low mass differences, this will practically be of no importance. If, however, such a known device is employed for materials with very different particles, it will no longer be ensured that a particle to be sorted out will be thrown onto the same place as the others if it has a very different mass. In particular, this will be the case when cleaning yet unhusked cereals.

Therefore, it is an object of the present invention to provide a method of the kind described and a sorting device for carrying out this method so that particles can be sorted out onto different places by means of a single actuating unit according to the command of an evaluation system, and/or particles of very different masses are sortable via one and the same actuating unit.

In accordance with the teachings of the invention this will be accomplished by adjusting the energy to be introduced onto the particle to be sorted out in dependence upon the result of the image analysis. In this way, it will be achieved that even a granular material consisting of very different particles can be sorted reliably, since the shape, mass, etc. of the particle can thereby be considered. By using just one or only few actuating units, by way of example, the constructional efforts and thus the space and room requirements can be kept very low.

In a further modification of the invention it ms suggested that the energy to be introduced onto the particle to be sorted out be adjusted in its value and/or period of time by the result of the image analysis This measure enables the adjustment of the energy to be introduced in a simple way.

According to a further embodiment of the invention it is suggested that the energy of a preferably gaseous medium be provided as the energy used for the sorting procedure, which energy is introduced onto the particle to be sorted out in the form of short-time energy pulses, with the period of time of the energy pulse being extended according to the required energy increase, whereby the sorting energy can be adjusted in a most simple manner.

Particularly in a further preferred embodiment of the invention wherein the sorting energy is introduced onto the particle via blast air, whose air pressure is adjusted in dependence upon the result of the image analysis, there can be achieved a very reliable working process ensuring the desired sorting quality.

In the case of a sorting device for carrying out the method by means of an optoelectronic sensor comprising an image analyzing system connected thereto, particularly for determining the color and/or size or shape of each particle, and having at least one actuating unit for introducing the sorting energy onto the particle to be sorted out, it is suggested according to the invention that a computing unit be connected at least indirectly to the output of the image analyzing system for determining the sorting energy required for the analyzed particle to be removed, and that the output of the computing unit be connected to the input of an energy control system of preferably each actuating unit, with an input device for energy parameters being preferably assigned to the computing unit. By means of this device the procedure can be carried out efficiently in a most simple way. The respective constructional expenses can be kept very low.

According to a preferred embodiment of the sorting device provided by the invention it is suggested that a proportion valve controlled by the computing unit be provided as energy control system on a pneumatic actuating unit, such as an air blast nozzle biased by compressed air. When using this arrangement, precisely that energy can be introduced over a wide area in a sensitive and exact way onto the particle to be sorted out which is required for expelling it into a storage container or the like.

If momentarily it is necessary to introduce additional energy in order to be able to introduce a greater amount of energy for the sorting procedure, exceeding the amount necessary in case of the basic adjustment or the basic adjustment range, it is suggested according to a further preferred embodiment of the invention that an actuating unit formed by an air blast nozzle be connected to an air blast source both via a check valve and a postponed relay valve and, via a further valve, to an air pressure accumulator, and that the relay valve and the further valve be controllable by the computing unit, with the further valve being designed adjustable in its throughput cross section and/or in its open period by the computing unit.

If in a further modification of the invention, in the air supply system of a pneumatic actuating unit, there is provided a plurality of pressure reducing valves connected in parallel and preferably presettable to different pressure values, which pressure reducing valves are switchable and/or controllable selectively by the computing unit, then a good adaptation of the energy required for the current needs can be accomplished in a simple way by opening and closing each valve.

In principle, actuating units of other designs can be used as well. Mechanical actuating units, such as ejector hammers or electrostatic actuating units, can be used advantageously for sorting purposes.

The device shown on the basis of FIG. 13 is advantageous even independently of its use in the cleaning system as it has been described above, in particular if the particles to be sorted are of greatly different masses, such as in sorting minerals. However, particularly advantageous is the use of this device for cleaning granular fruits, such as cereals, soybeans, coffee, cocoa, etc. in the manner described previously.

BRIEF DESCRIPTION OF THE DRAWINGS

Further details of the invention will become apparent from the following description of the embodiments schematically illustrated in the drawings as follows.

DETAILED DESCRIPTION OF THE DRAWINGS

Figure 1A:
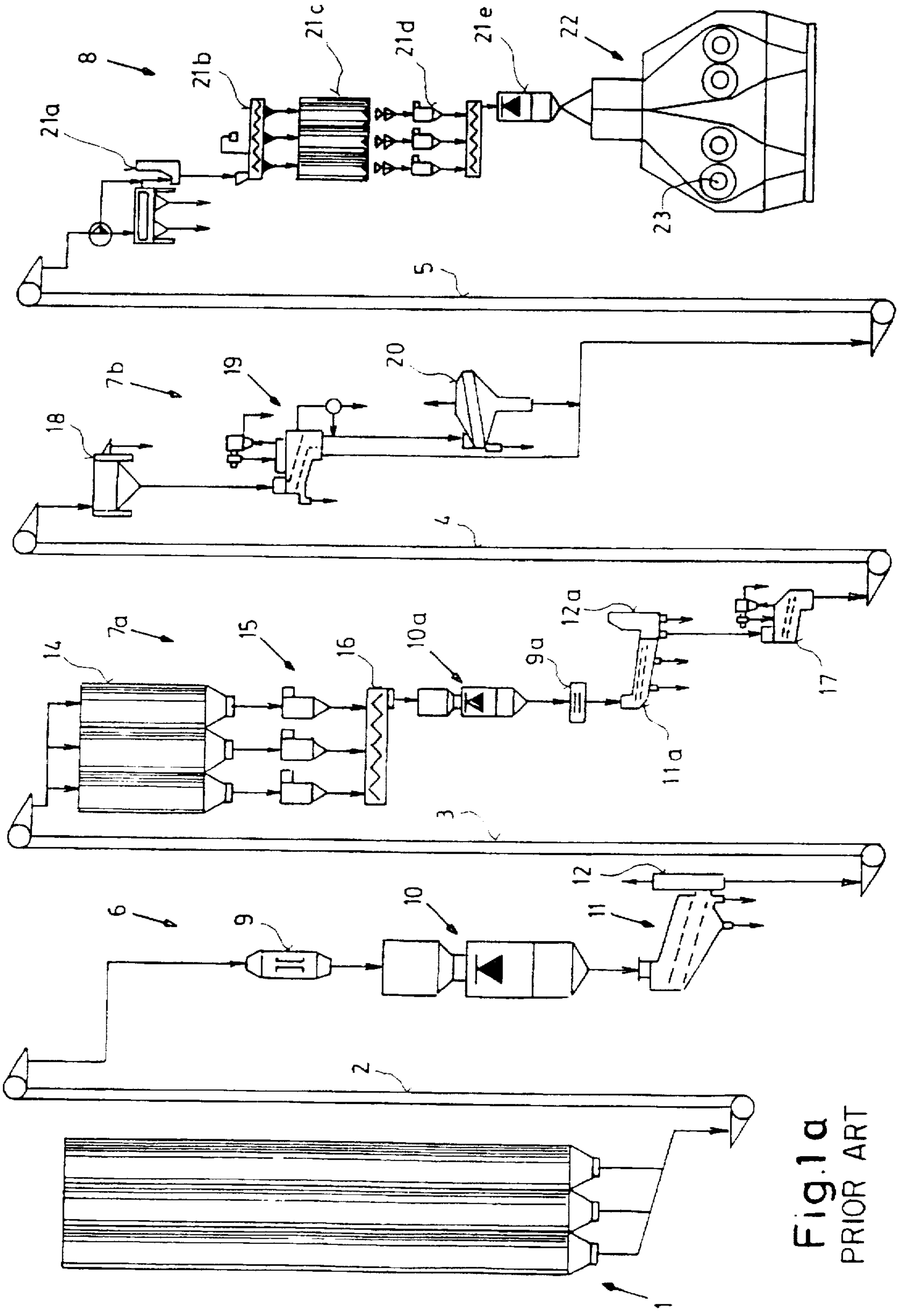
Fig.1a PRIOR ART
FIG. 1*a* Milling plant for semolina according to the prior art.

FIG. 1*a* schematically shows the example of a semolina mill equipped with a number of cleaning machines in order to illustrate what savings can be achieved by the invention. However, it is to be understood that the invention is not limited to such mills but that it can also be employed for other milling types in which a lower number of cleaning machines may conventionally be provided.

The FIG. 1*a* is subdivided just optically into individual sections by four elevators 2 to 5 merely schematically indicated. In place of the elevators 2 to 5 any other suitable means of transport can naturally be used as well. For the cereals supplied there is provided a group of reception bins 1 on the very left. In a precleaning section 6 in-between the elevators 2 and 3, treatment steps are carried out for removing coarse and fine impurities. The treatment steps of a first cleaning procedure are represented in a first cleaning section 7 or 7*a* and 7*b* arranged between the elevators 3 and 4 and between the elevators 4 and 5. To the right of the elevator 5 there follows a treatment section 8 comprising a second cleaning system, preferably in the form of a scouring device 21*a* having a soaking device unit 21*b*, tempering bins 21 and a flour roller mill 22.

The material supplied from the reception bin 1 is first led to a magnetic separator 9 and thereafter to scales 10. Then follows a sieve device 11, preferably in the form of a vibration classification sieve with a first and a second sieve. The first sieve is a so-called coarse screen, separating coarse impurities, such as lumps of earth, parts of wood and straw, and stones, etc. from the cereals and the small impurities. The small impurities, such as sand, are at least partially sorted out from the cereals by the second sieve. For removing dust particles the grain is then led through an air current, preferably through a wind sifter 12. This precleaning has to be carried out in the case of high throughputs of bulk material, and for this reason it cannot separate the contaminations sharply from the cereal grains.

After the precleaning the precleaned grain reaches a raw fruit bin 14, where it is ready for further treatment, separated according to grain varieties. The further treatment preferably includes the first cleaning, a first soaking and settling, a second cleaning and a second soaking and settling as well as the grinding. When producing flour mixtures from different grain varieties there are employed different treatment types. For example, the desired mixture can be manufactured from different grain varieties immediately after the raw fruit bins 14 so that the grain mixture will be further treated. If required, the different grain varieties arranged separately reach the first cleaning for the first soaking procedure, and are then mixed after the first settling, or it is provided to lead the different grain varieties also in a separated arrangement through the second cleaning for the second soaking and settling and, if necessary, to mix them only after the grinding. For treating a certain grain mixture, the grain varieties required for this are taken from the bins 14 and mixed by means of flow governors 15 allocated to respective raw fruit bins 14, whereafter they are supplied to scales 10*a* determining the weight of the mixture.

The first cleaning succeeds the scales 10*a*, comprising, if required, a further magnetic separator 9*a*, a further sieve-cleaning device 11*a* with wind sifter 12*a*, a stone separator 17, at least one indented surface separator 18, a fluid-bed stone separator 19 and a specific gravity separator 20. The sieve-cleaning device 11*a* effects a partitioning into cereal grains and larger and smaller impurities with the help of two vibrating sieves. Owing to the smaller throughput and the smaller classification limits a better separation will be achieved compared to precleaning. On the one hand, the stone separator 17 enables a separation according to the specific weight with its vibrations, on the other hand, due to the fluidized bed generated therein, there is also produced a separation according to the air resistance. A separation is carried out according to shape and size by at least one indented surface separator of the round and/or spiral and/or disk type 18 by carrying along desired grains with respectively formed pockets. Undesired particles, such as degenerated grains, broken grains, too long or too round particles, are eliminated. The fluid-bed stone separator 19 carries out—similar to the stone separator 17—a separation according to specific weight, so that heavier components (e.g. stones as big as grains) can be eliminated. The specific gravity separator 20 is provided for removing unsatisfactorily developed grains, broken grains, etc.

After this first cleaning in the sections 7*a*, 7*b*, the grain passes through a scouring device 21*a* and a soaking device 21*b* with automatic humidity control into tempering bins 21*c* with outflow governors 21*d*. The scouring 21*a*, the soaking 21*b* and the conditioning in the tempering bins 21*c* are preferably provided twice in a row before the grain is finally led to a flour roller mill 22 preferably via scales 21*e*. When using such an arrangement, the roller mill 22 represents a whole series of such roller mills, with the first roller mill 22 carrying out the opening of the grain in a manner known per se, by having its rollers 23, which are spaced in predetermined distances and equipped with corrugations, driven with different speeds such that the side of the respective grain facing one of the rollers 23 is torn away, which causes the uncovering of the contents of the grain corresponding, by and large, to the flour. In the further passages, this share of flour will then be separated from the husks or ground according to the desired degree of fineness.

The invention is now based on the recognition that the machines required for the first cleaning, particularly the sieve-cleaning device 11*a* comprising the wind sifter 12*a*, the stone separator 17, at least one indented surface separator 18, the fluid-bed stone separator 19 and the specific weight separator 20, can be replaced at least in part, if an optical sorting device is used in their place. Such an arrangement can be seen, for example, in FIG. 2.

Figure 1B:
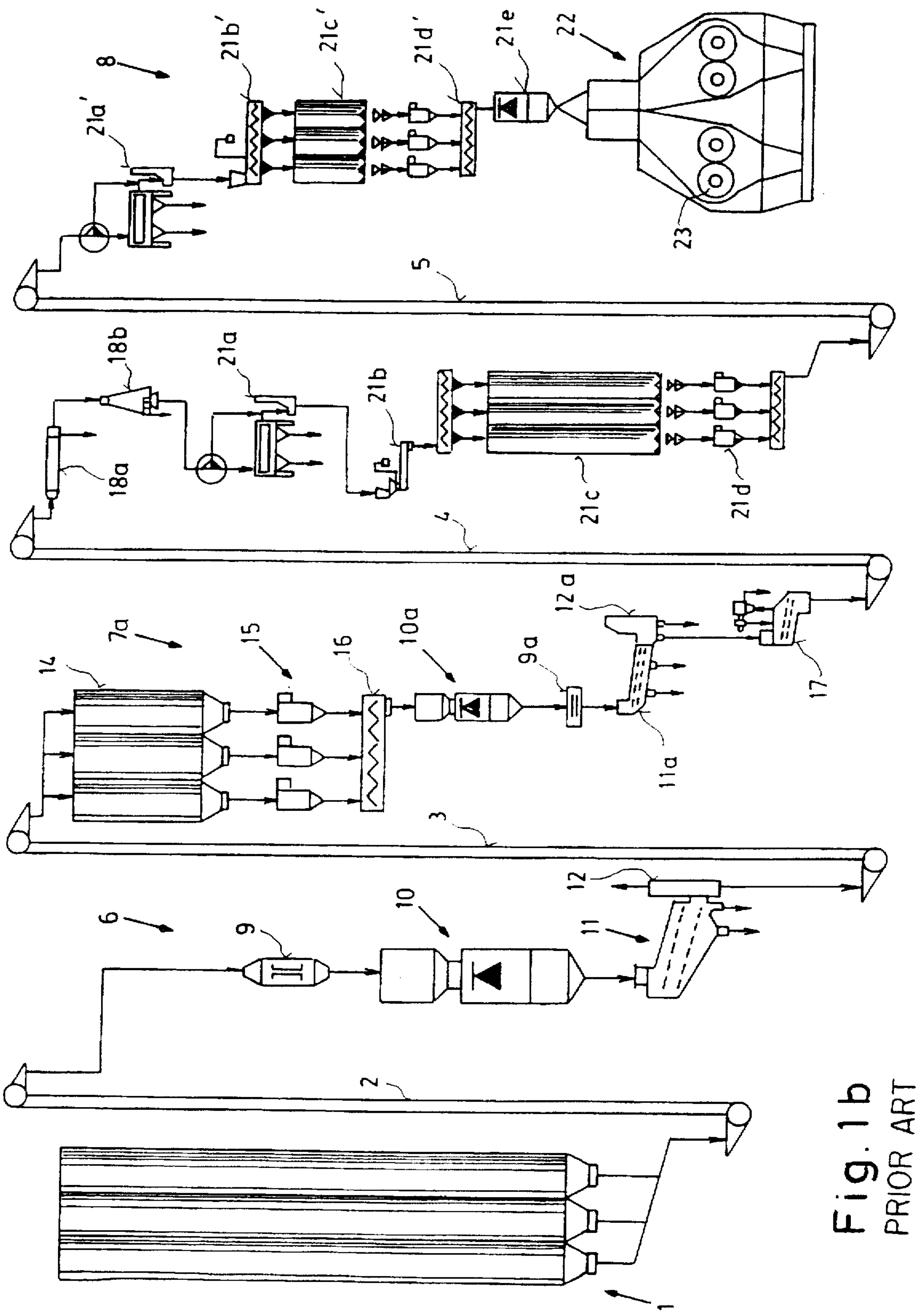
Fig. 1b PRIOR ART
FIG. 1*b* milling plant for soft wheat according to the prior art.

Since the semolina treatment represented in FIG. 1*a* provides an extremely expensive first cleaning, the treatment of soft wheat according to the prior art will be illustrated in a second example in FIG. 1*b*. A comparison of the FIGS. 1*a* and 1*b* shows that in the first cleaning of soft wheat there is neither provided a fluid-bed stone separator 19 nor a specific weight separator 20. In addition, preferably indented surface separators of the round and spiral type 18*a*, 18*b* are employed for the cleaning of soft wheat. A further difference between the FIGS. 1*a* and 1*b* consists in the fact that the twofold passage through the scouring, the soaking and the conditioning by means of the devices 21*a* to 21*d* and 21*a'* to 21*d'* is represented twice.

Figure 2:
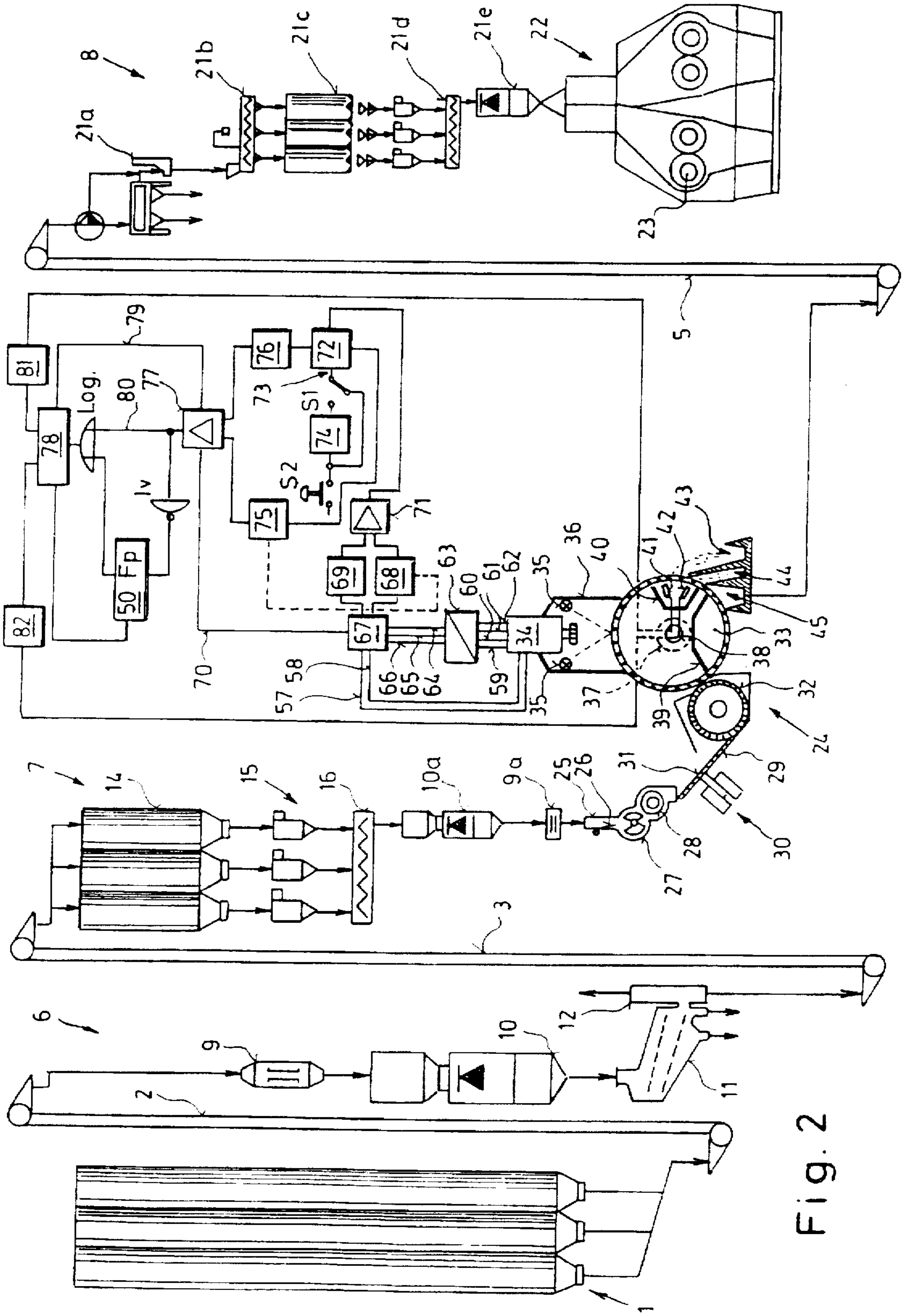
FIG. 2 milling plant comprising an optical first cleaning.

As can be seen on the basis of a comparison between the FIG. 1*a* or FIG. 1*b* with the FIG. 2, the elevator 4, the sieve 11*a* with the wind sifter 12*a* as well as the machines 17 to 20, or 17 and 18, are missing. In their place there is provided an optical sorting apparatus 24 represented in detail and especially equipped, taking over the work of the machines omitted. However, it may be mentioned that FIG. 2 represents only one example and that in the case of mill diagrams differing from FIG. 1*a* the machines conventionally provided in such an arrangement, particularly the machines of the first cleaning 7, can be replaced by the device 24. Even though it would be possible per se to replace even further machines of the precleaning stage by the optical installation 24, this will generally not be convenient.

Accordingly, material to be sorted out, which is supplied via the magnetic separator 9*a*, passes to a distributing device 27 via an inlet duct 25 conveniently comprising a dosing device 26, e.g. in the form of a flap changing the shaft cross section. Such an arrangement may be designed in a similar way to the one represented in the FIGS. 10 to 13 of the U.S. Pat. No. 4,905,917 on the basis of the installation 30 and a postponed feed-in roller 8, with the feed-in roller 28 immediately succeeding the distributing rotor 27 in the case of the present FIG. 2.

To avoid accumulations of grains, there is suitably provided a vibroconveyor 29 with a vibrational driving mechanism 30 for preparing the individualization, in which case it is advantageous to design the vibroconveyor 29 with individual feeding channels 31 conveniently running parallel to each other in the direction of flow. These feeding channels 31 already separate individual rows of succeeding particles from each other, which is accomplished by the fact that the feeding channels 31 are of a width that corresponds to the width of a grain. In this way, the grains are not only distributed over the width of the vibroconveyor 29, but they are also arranged one behind the other, so that only the procedure of arranging the individual grains into exactly predetermined positions relative to each other remains to be carried out.

This procedure is conducted in such a way that individual grains, spaced in a non-predetermined manner, reach the end section of the vibroconveyor 29 through its feeding channels 31 open on their upper ends. Within this end section, i.e. in this particular case directly at the end of the vibroconveyor 29, but also at a separate section, if required, there is conveniently arranged an accelerating device 32 in the form of a brush roller (or at least an air blast nozzle) in order to impart to the grains at least the speed of a postponed drum 33. On the drum 33 the grains are held fast by suction openings. If required, the suction openings are arranged in recesses of the drum surface. In place of the drum 33 there may also be provided a conveying belt at least partially permeable to air. Of course, it would also be possible to observe the individual particles during a free fall thereof.

By means of the accelerating device 32 an irregular distribution of the grains with individual granular accumulations subsequent to the vibroconveyor will be prevented from developing. There is rather imparted such a speed to the grains that they are distributed over the drum surface, coming to lie on suction openings. Thus, the grains are arranged in the manner shown into predetermined positions relative to each other in front of a monitoring device conveniently comprising, if necessary, even more than one television camera 34 with a lighting installation, but which could also be formed by photoelectric transducers. This device is preferably situated in a light-proof casing 36 in order to eliminate the influence of foreign light. Any video camera can be used per se as the television camera 34, particularly a solid-state camera, such as a diode array or a CCD camera.

It may be mentioned that such a vibroconveyor 29 with feeding channels 31 may be subjected to numerous modifications, for example, by omitting the vibratory driving mechanism or by designing the feeding channels 31 slightly divergent instead of running parallel to each other in the direction of flow. A further individualizing effect can also be achieved by providing the feeding channels 31 with individual stripes of material of different frictions running crosswise to the direction of the feeding channels 31, which stripes of material are either uniform in width or have an increasing width in the direction of flow. The acceleration can also be effected in different manners, e.g. by at least one acceleration drum projecting through the vibroconveyor 29 over a partial section thereof or a centrifugal disk provided already at the initial section of the vibroconveyor 29, accelerating the grains tangentially onto the vibroconveyor 29, etc.

As soon as the grains are thrown against the drum 33 by the accelerating device 32, a reduced pressure applied in the interior of the drum 33 begins to take effect in the area of recesses suctioning the grains merely in the area of the recesses.

The drum may be provided over its circumference with individualizing ribs or channels similar to the feeding channels 31 of the vibroconveyor 29, with suction holes being arranged at regular distances. The grains are then held fast on these suction holes, whereby they become located in a predetermined position relative to each other, and are taken to the monitoring device 34 within the casing 36. To effect the respective reduced pressure, there is again provided an opening 38 projecting through a hollow stub shaft 37. Thus, above the sealing wall 39 in the interior of the drum 33, there prevails a corresponding reduced pressure ensuring the engagement of the grains on the drum 33 even in the case of high speeds, with a further casing 40 being designed such that the reduced pressure can be effective there too, by way of example, and that the grains will be expelled only when the reduced pressure is overcome by the blast pressure exerted by nozzles 41, 42 arranged therein, of which nozzles the one throws the particles to be sorted out into a trough 43, the other throwing them into a trough or a duct whereas a sealing arrangement on the covering wall 39 takes care that the suction pressure in the area below this wall 39 cannot take effect so that the particles found good will fall into a trough or a duct 45. If only good and bad particles are to be classified, the nozzle 42, for example, can be omitted. On the other hand, for sorting into several particle classes, however, there may be provided further nozzles. The most extensive particle class preferably passes into the duct 45 without any blow-out effect occurring.

The video camera 34 is represented with its preferred circuitry. Such a conventional solid-state or tubular camera for the release of color signals generally has six outputs, i.e. an output 57 for the horizontal deflection signal (this term is to include also the corresponding signal of a solid-state camera), an output 58 for the vertical deflection signal (if it is not merely a line array camera), an output 59 for the red signal, an output 60 for the blue signal, and an output 61 for the green signal. In addition, there is provided an output 62 for the Y signal (brightness). Now, it will be more convenient for the processing if a converter stage 63 is connected to these outputs, which converts these signals into the so-called IHS system, so that a line 64 for the brightness signal, a line 65 for the color saturation signal and a line 66 for the hue signal will be produced on the output of which. Of course, the converter stage 63 may be omitted if the camera 34 is already designed per se such that it has respective outputs on the lines 64 to 66, or else if the signal evaluation substantially requires the red, blue and green signals.

In the edge area of the drum 33 there is preferably arranged a color reference pattern, and clock trackings are arranged at predetermined positions on the drum itself, so that during a deflection period the signal sections corresponding to these references will occur at a precisely determined position within the video signal, with the clock tracking being adjusted for determining the particle speed, or a line or array being read out with each clock pulse to define the release of the image point in the direction of flow and to facilitate the measurement of the particles. Thus, when the lines 57, 58 are led to a change-over stage 67, it is capable of establishing on the basis of the deflection signals whether the ingoing signal comes from such a reference point or a clock tracking or from another point. Accordingly, the signals are partitioned by the change-over stage, with the reference signal released by the color reference pattern being applied to a reference memory stage 68, and the signal coming from the drum surface—with the exception of the clock tracking signals—being sent to a stage 69, whereas the clock tracking signals reach an output line 70.

The inputs of a reference stage 71 are connected to the outputs of the stages 68, 69, which reference stage 71 has a compensating effect by subtraction of any irregularities or changes of the brightness of the background, so that a readjustment of the lighting devices 35 is not absolutely required. It will be advantageous if a further subtraction is carried out, which is based on the learning ability of the circuitry.

For if a certain color or brightness for the bulk material particles is required, different procedures will be possible. The simplest way is to preset a threshold value for a desired brightness and, if this desired brightness threshold should not be reached, to eliminate the respective particle by actuating a blow-out nozzle or another sorting device. If, however, one wants to sort according to color, a plurality of color channels (substantially corresponding to the lines 59 to 62 or 64 to 66) as well as threshold value indicators located in these channels could be provided analogous thereto. In a digital way, this will be achieved by inputting the respective color parameters on a keyboard, but which, on the one hand, is tiresome and, on the other hand, will be unreliable due to the many error possibilities. Also in this case, it will be convenient to choose another way.

If prior to the sorting of a bulk material to be monitored, a learning run is started by making a number of grains (in fact, one of them would be sufficient) pass by the video camera 34 at the beginning of operation, or—in the case of a matrix or tubular camera—by making them left standing, then the color of this reference grain can be read in to serve as a reference value for the desired color at a later stage. For this purpose, a change-over stage 72 may be provided at the output of the comparator circuit 71 (or, if it is not provided, because a background control according to the prior art is preferred, at the output of the camera 34 or the stage 69). This change-over stage has a switchable control input 73 in the present embodiment (however, not necessarily), so that its change-over via a selector switch S1 can be controlled by means of a time funtion element 74, which automatically switches the change-over device to normal operation after a period of time corresponding to the passage of the reference sample, or the change-over can also be carried out manually by a hand switch S2 according to the position of the selector switch S1, by whose opening or closure there is effected the change-over of the stage 72. Such a hand switching is particularly advantageous if the period of time for the time function element 74, which is preferably adjustable, cannot be determined exactly from the outset (e.g. a sample of grains will be sent some days before to be able to correspondingly sort out later on).

According to the position of the change-over stage 72 a learning run or normal operation will be chosen, with at least one memory unit 75 being connected in the first case, which memory unit 75 is preferably designed as a non-volatile memory (e.g. floppy disk). In the learning run at least one particle and the background, but, if necessary, also several particles with each one representing one particle class, are subjected to a color evaluation and the values resulting therefrom will then be stored. For this purpose, several storage locations 75 with selective accesses, i.e. either several separate memory units or a single, correspondingly larger, memory unit 75 having addressable memory locations are rendered connectable to the output signal of the camera 34 or the comparator stage 71. It is convenient to connect the memory unit 75 to the memory unit 68 to be able to correct its contents in dependence upon the illumination color of the color reference sample, if necessary, and to thus avoid any sorting errors. It is true that alternatively it would also be conceivable to assign such a control device to the illumination unit that its color values are steadily held constant, but the connection line represented in broken lines between the two memory units 68 and 75 forms the simpler way to a corresponding correction.

If the change-over stage 72—controlled by the time function element 74 or the switch S2—switches over to normal operation, it delivers the signals received to a temporary storage stage 76 located in parallel to the memory unit 75, or directly to the one input of a comparator or a control stage 77 whose other input is connected to the output of the reference signal memory. In such an arrangement, there can thus be carried out a steady comparison between a reference signal and the ACTUAL signal of the grains examined. In the case of several defined particle classes, the comparison is carried out on the basis of the respective stored particle and background basic values. The comparison stage 77 will have adjustable and conveniently predetermined threshold values, so that it delivers no output signal at all in a case in which the signal lies within the tolerance field for the particles not to be thrown out or the background. The particles which are not to be thrown out are preferably those which are numerically the most frequent ones, i.e. in the normal case the good particles. However, the comparator stage 77 will deliver a signal via an output 80 to a change-over stage 78 according to the particle class detected. The signal applied is used to control one out of preferably two selection stages 81 or 82, if required even more than two, by means of a corresponding valve as a final control element for actuating one of the preferably two, and, if required, even more than two, nozzles 41 or 42. To synchronize this actuation, the clock signal line 70 is connected to the comparator and control stages 77. If required, an ejector nozzle is controlled such that it expels everything which has not been detected as background or as appertaining to a particle class as a foreign part by means of an ejector nozzle.

If the different particle classes are particularly distinguished by their shapes rather than by their colors, it is preferably provided to treat particles of all particle classes as good particles in the color detection step and that the vectorial subtractor 77 provides no output signal at all in the case of good particles or grains. However, it can now be seen that the line 80 does not directly control the change-over stage 78, but that a shape processor Fp is also associated with the line 80. This shape processor Fp receives the output signal of the subtractor 77 conveniently via an inverting stage Iv. For if merely good and bad particles are distinguished, the shape processor Fp is actuated via the inverter Iv only in the case of grains of good color and thus when the output signal of the vectorial subtractor 77 disappears, which facilitates its operation (in comparison with a possible parallel operation of subtractor and shape processor, which would also be possible).

At the outputs of the stages 77 and Fp, there is situated a logical member Log, which is represented in this case only as OR linkage, controlling the change-over stage 78 in dependence of the signals of the two stages 77 and Fp. When using such an arrangement, more than only two ejector nozzles 41 and 42 will generally succeed each other to be able to sort out according to colors and sizes and/or shapes or qualities, in which cases, as can be expected in the circumstances, a mere sorting according to color or only according to size and/or shape will be sufficient. Shape information will comprise at least an actual particle contour and/or at least a derived value, such as the first, the second and/or the third surface moment. In the learning run, at least one particle contour and an appertaining tolerance range can be determined as property of a particle class, if required, so that the shape processor will be enabled to compare the current particle contour with the possible contours of this particle class.

It should be understood that numerous modifications are conceivable within the scope of the invention; for example, all conventional optical sorting devices can be employed, if they are equipped with color and/or size and/or shape detection devices.

Unnecessary blowing out will be avoided if the color of the background formed by the drum 33, as already mentioned above, is established. A particle to be eliminated is only present if no "good" grain nor a grain appertaining to a defined particle class nor the background either is scanned.

In case of need, the background could also be calculated via the deflection signals, for the openings situated next to each other for receiving the grains are likely to pass successively always at the same place, and the presence of a series of grains can also be detected via clock signals, but this would entail too great imprecisions, particularly since it may happen that a drum opening will not even be occupied (which would then act as reference color).

If the above-mentioned connection represented in broken lines between the memory units 68 and 75 exists, the reference signal for red, the reference signal for blue and the reference signal for green can be stored within the system of coordinates of the color signals IHS, which system of coordinates practically represents a three-dimensional order within the memory unit 75. These reference signals can then be examined, conveniently at least at the start of operation, but, if necessary, also in periodical time intervals, by retrieving the output signal of the memory unit 68, in which the respective color signal taken from the standard color pattern is present, and by comparing it with the values stored for red, blue and green. If a deviation occurs due to the hue change of the illumination, all color values will be corrected to the same extent (corresponding to a turn of the three-dimensional system of coordinates), so that the reference values are adapted thereto, even in the case of a changed illumination.

Figure 3:
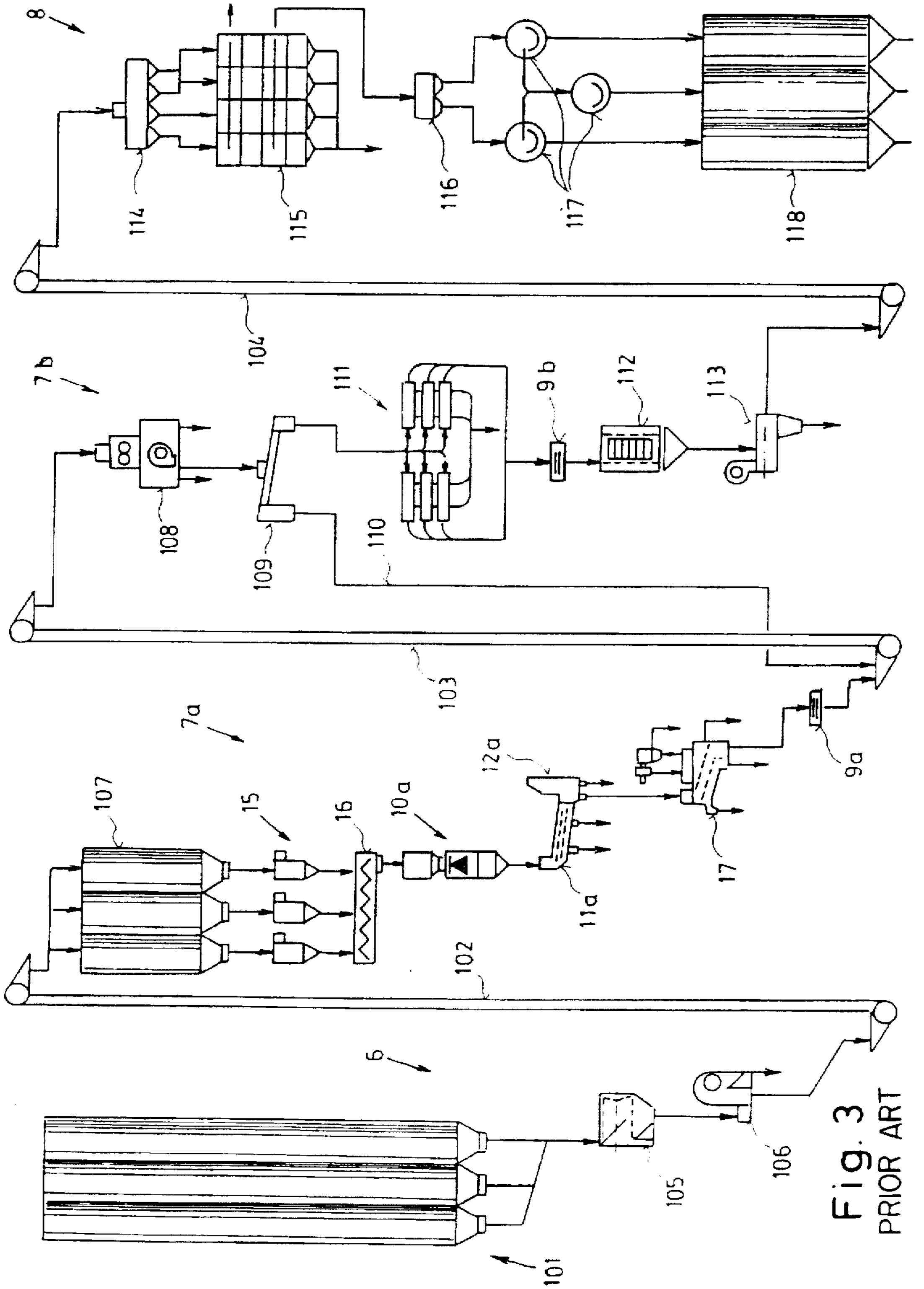
Fig. 3 PRIOR ART
FIG. 3 rice milling plant according to the prior art.

FIG. 3 schematically shows a rice treatment in which paddy rice or parboiled rice is conveyed by means of elevators 102, 103, 104 from reception bins 101 to respective further treatment sections. In place of the elevators 102, 103, 104 there can also be used other suitable means of transport, and the arrangement of the means of transport as well as the partitioning into treatment sections separated thereby may differ in dependence of the respective circumstances.

In the example represented, the precleaning directly joining the reception bins 101 substantially comprises a sieve-cleaning machine 105, e.g. a drum sieve, for removing coarse impurities, and a wind sifter 106 for the removal of dust. If required, a magnetic separator will also be provided. The precleaned product is kept ready for use in rice bins 107 for the further treatment in a section of the first cleaning 7 or 7*a* and 7*b*, and then passes via flow governors 15, a conveyor 16 and scales 10*a* to a sieve device 11*a*, preferably a vibratory sieve machine having a first and a second sieve. The sieve device 11*a* separates particularly two fractions from the bulk material, i.e. larger and smaller impurities. A wind sifter directly joining the sieve device 11*a* substantially eliminates the dust being present in the bulk material. From the remaining bulk material there are sorted out impurities with densities and shapes or air attack surfaces differing from those of the rice grains. If required, a further magnetic separator will be provided after the dry stone separator 17.

In the previously described section of the first cleaning 7*a* or 11*a*, 12*a*, 17, 9*a* there are eliminated weed or foreign seeds, sand lumps, stones and small iron particles. Besides these impurities the husk is now removed from the rice grain in the section 7*b* by means of a husking device 108 and is sorted out in the air current by table separators 109. Since apart from husked rice grains and husks also unhusked rice is discharged from the husking device 108, the table separators 109 have to separate also unhusked rice from husked one. Owing to the small difference, this separation can be achieved only with great expenditure of energy, and even then only to an unsufficient extent. To ensure that substantially no unhusked rice grains are carried along together with the husked ones, one has to put up with the inconvenience that along with the unhusked grains a great share of the husked grains will again be led to the husking device 108 via a return line 110 and the elevator 103.

To remove unripe unhusked grains or green rice, an expensive sorting device has to be used for carrying out a sorting according to thickness. For this purpose, drum sorters 111 according to FIG. 3 are employed in the plant. Both the expenses for machinery and the strain on the good rice grains are high, leading to a particularly inefficient treatment step in the case of a small share of green rice. At the end of the first cleaning, the rice possibly passes through a magnetic separator 9*b*.

In a second cleaning, the rice is ground by means of ring grinding machines 112, polished by polishing machines 113 and freed from dust by means of aspiration.

In a treatment section 8 succeeding the elevator 104, the product is distributed onto plansifters 115 via a distributing device 114. Lumps and fine particles of broken rice are eliminated by the plansifter, so that substantially only rice grains having a predetermined minimum size pass into indented surface separators 117 via a further distributing device 116. The indented surface separators classify the rice into predetermined size classes. Preferably, there is carried out a classification into ¾ to 1/1, ½ to ¾ and ¼ to ½ grains. The sorted rice then passes into corresponding size class bins 117. Possibly, the sorted rice grains will then be subjected to a color check in order to eliminate grains with black spots.

Figure 4A:
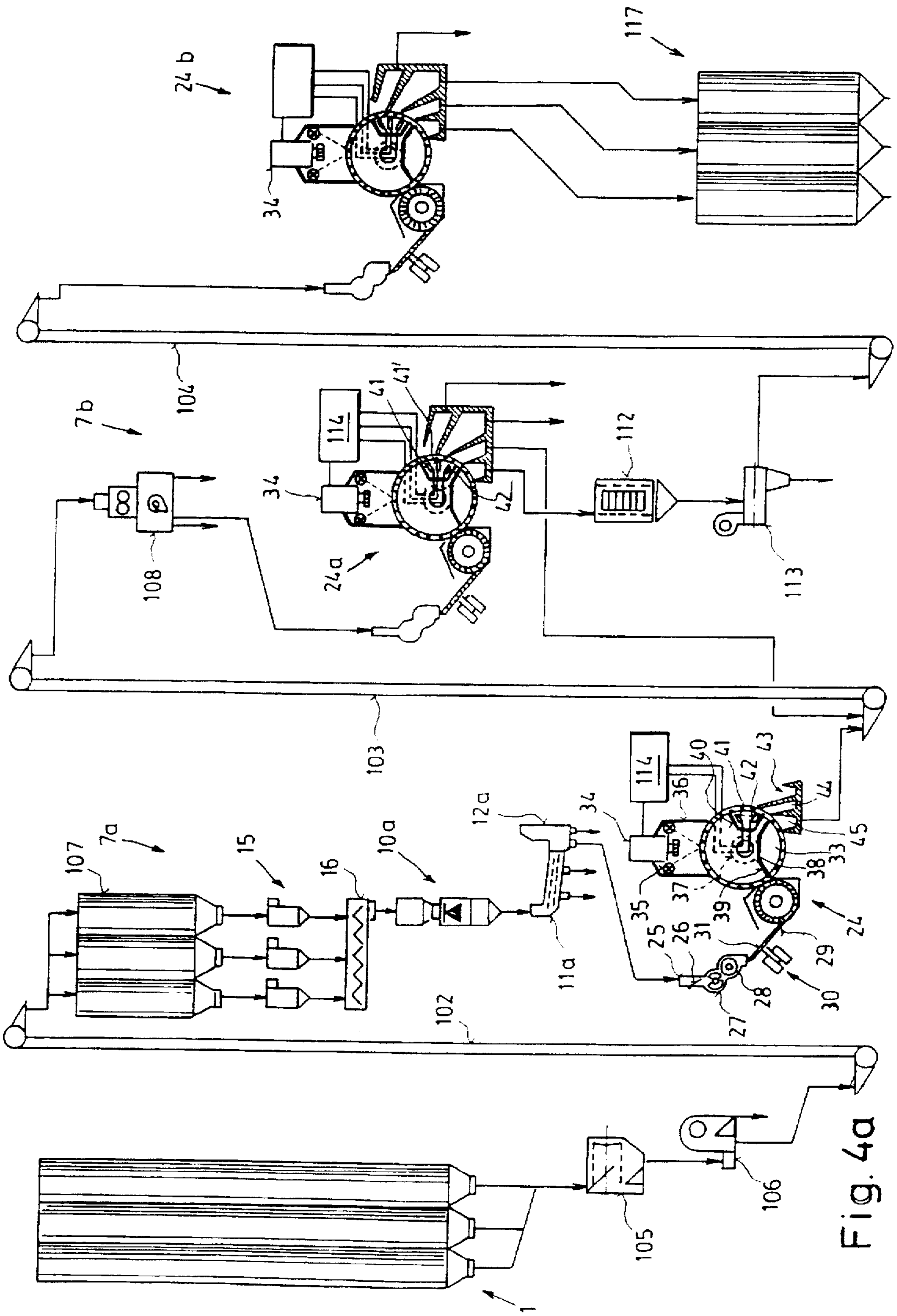
FIG. 4*a* rice milling plant comprising optical cleaning and sorting sections.

According to FIG. 4*a*, a solution in accordance with the invention provides that in place of the dry stone separator 17 arranged in the section 7*a* of the first cleaning, and possibly also of the magnetic separator 9*a* (cf. FIG. 3), there is provided an optical sorting device 24. As described above, the particles led to this sorting device can be assigned to different predetermined particle classes and then be partitioned in a sorted manner into corresponding partial streams of bulk material. An evaluation and control electroncics 114 connected to the video camera 34 and to at least one expeller device 42, 41 ensures that in the case of a partitioning into good and bad particles all bad particles are expelled into the trough 43 or into the duct 44. The good particles fall from the drum 33 into the duct 45 in the drum section formed by the covering 39 without any suction effect occurring. Besides the possibility of sorting out everything together which has not been detected as good particles, it may also be provided that all impurities of a predefined color and/or size and/or shape class are sorted out separately from the other bad particles by means of a corresponding expeller device 41. This may be of interest when foreign seeds from bulk material with a high share of foreign seeds are to be separated from the non-biological material and, if required, eliminated for further use.

The optical sorting device enables an extremely sharp separation of good and bad particles, so that only few good particles are to be found in the eliminated particles and only few bad particles in the particles found good. The separation limit can be easily adjusted by indicating just another set of values representing the good particles and stored previously, if required, by way of example. Since the optical sorting device 24 also comprises a learning mode, the desired product can be put in front of the optical sorting device for detecting the class-determining parameters e.g. for a new variety of rice prior to the treatment process. Since the cleaning according to the invention is substantially a sorting procedure, there arise possibilities whereby the first cleaning becomes distinctly more efficient. For example, besides impurities, also rice grains that are not fully developed or even degenerated can be sorted out prior to the husking device 108. If required, also good particle classes of different grain sizes can be separated, whereafter they will be husked in optimally adjusted husking devices 108.

In the section 7*b* of the first cleaning, joining the husking device, there is a further advantageous range of application for an optical sorting device 24a. In such a case, it can replace the table separators 109 and the drum sorters 111 provided by the prior art. The table separators 109 are large and are based on the reciprocal lifting motion principle, so that great demands are put on the construction volume and the building strength. These demands will disappear with the use of the optical sorting device 24a. Apart from the decrease in the expenses for machinery and the building, there results an optimization of the return of unhusked rice grains. By means of the table separators 109, husked and unhusked rice grains are separated according to their specific weights, impact behaviors and leakage capacities, with the separating efficiency being bad due to the small differences. To keep the share of unhusked rice within the husked one down to a small level, one has to put up with the fact that the fraction returned to the husking device 108 is equally composed of husked rice and unhusked one, resulting in a return of about 20% in the case of the husking devices known.

Since the unhusked rice (paddy rice) and the husked rice (brown rice) differ in their sizes (approximately 5%) and in their colors, the optical sorting device 24a can ensure a distinctly sharper separating efficiency in comparison with the table separator 109 known, so that the share of husked rice returned to the husking device 108 is minimalized. Besides the classes of the husked good rice and of the unhusked rice, the optical sorting device will preferably sort out separately at least one further class, such as green rice, discolored and/or deformed rice or, if necessary, impurities. For this purpose, a number of expeller devices 41, 41', 42 corresponding to the number of the classes to be expelled is controlled by the control system 114. By sorting out green rice with the optical sorting device 24a, also the expensive drum sorters 111 will become obsolete. Again, it can be seen that a cleaning functioning as a sorting into different color and/or size and/or shape classes possesses considerable advantages over a conventional separating device.

In place of the plansifters 115 and the indented surface separators 117 there can be employed an optical sorting device 24b in order to sort out the desired size classes and, if necessary, the broken rice or impurities. Simultaneously with the size classification, a color classification, e.g. for sorting out rice discolored black, can be carried out, so that no additional color classification will be required. Combined sorting criteria open up separating possibilities which, up to the present moment, have not existed nor have they been convenient due to too great an expenditure caused. For example, a rice fraction discolored black can be separated from non-discolored rice without any additional expenditure being required. By the separate sorting of different contaminations they can be further used in an optimum way and not all of them have to be eliminated as waste. A substantial advantage of the optical sorting device 24, 24a, 24' is its universal use due to the possibility of separating particle classes with any size and/or shape and/or color properties from each other. The cleaning and sorting requirements of different rice milling plants can thereby be met by using one and the same device.

Figure 4B:
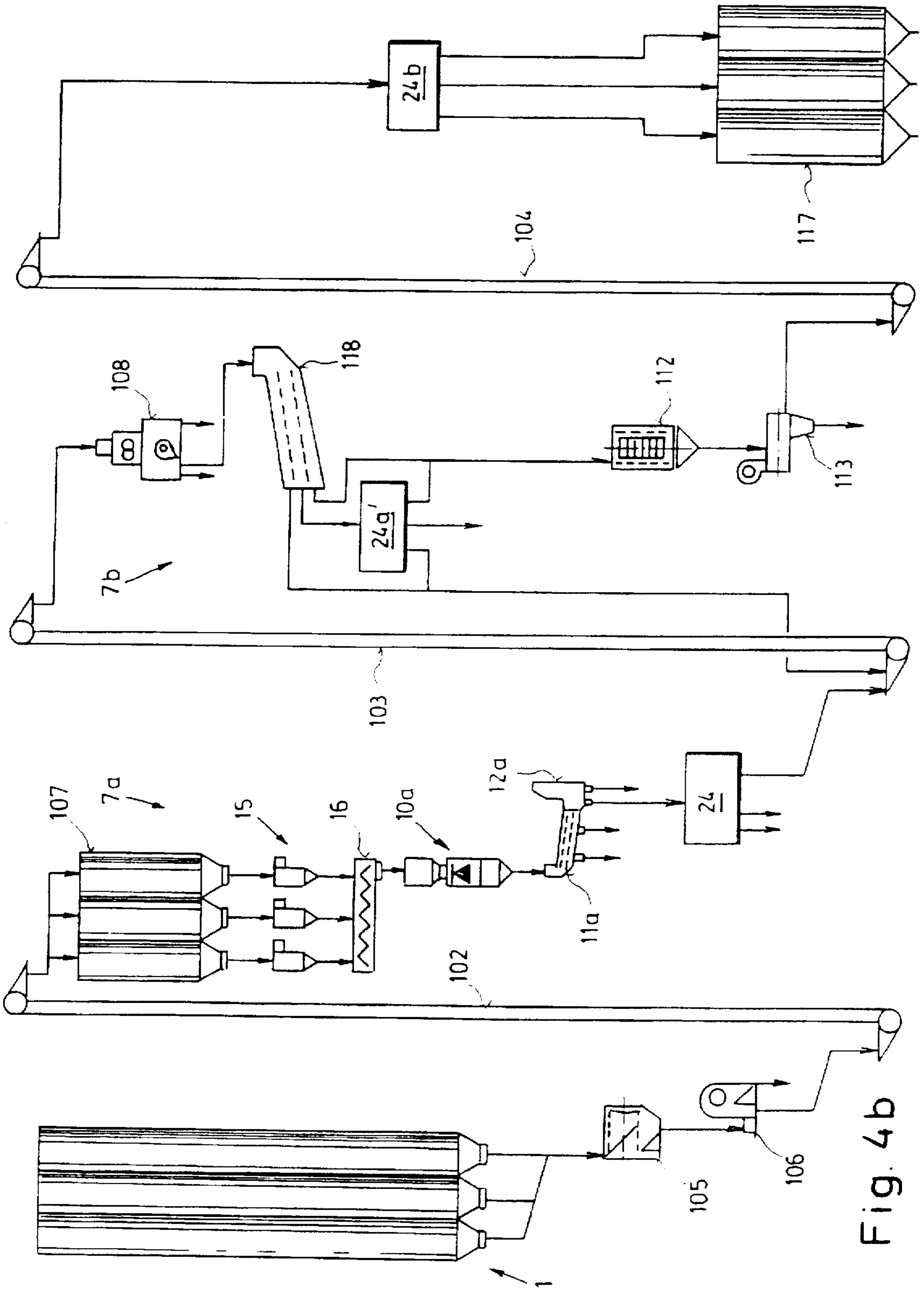
FIG. 4*b* rice milling plant wherein a paddy separator and an optical sorting system are provided immediately after husking.

An embodiment according to FIG. 4b then provides a combination of a plansifter 118 having an optical sorting device 24a' subsequent to the husking device 108 for increasing the throughput. The plansifter 118 separates the product stream into the following three fractions, i.e. unhusked paddy rice, a mixture of unhusked and husked rice and husked rice. The optical sorting device 24a' then separates only the mixed fraction into unhusked and husked rice and, if necessary, into bad particles, such as green rice.

Figure 5:
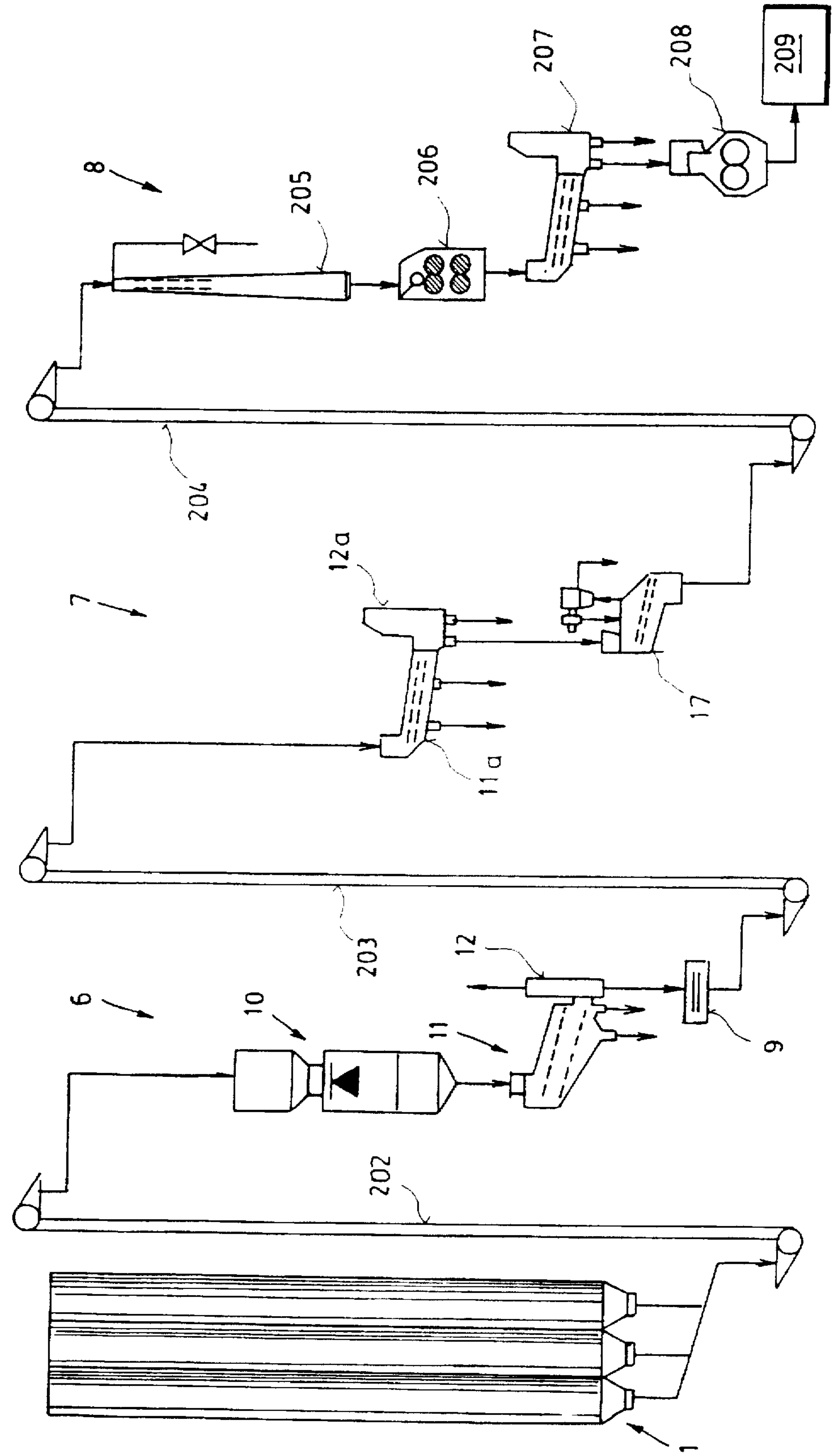
Fig.5 PRIOR ART
FIG. 5 soybean manufacture according to the prior art.

FIG. 5 shows a conventional treatment of soybeans for the oil manufacture. By means of elevators 202, 203 and 204, different treatment sections are separated from each other. From reception bins 1 the soybeans preferably pass via an elevator 202 into a precleaning section 6 comprising scales 10, a sieve device 11, a wind sifter 12 and, if required, a metal separator 9. By means of the precleaning, there are eliminated both coarse impurities, such as earth lumps, pieces of wood and straw, and stones, etc., as well as fine particles. To remove dust particles, the cereals are then led through an air current, preferably through a wind sifter 12. This precleaning has to be carried out in the case of high throughputs of bulk material, and therefore, it cannot eliminate the contaminations in a size range of the cereal grains.

The precleaned product passes via the elevator 203 to the first cleaning in a section 7 having a further sieve-cleaning device 11a comprising a wind sifter 12a and a stone separator 17. If required, there is provided a slanted belt for dividing off half or split soybeans in such a manner that the parts of beans will remain lying there, and the integer soybeans will fall down. The fractions of soybeans are to be eliminated because they have an increased infestation with bacteria. Via the elevator 204, the soybeans pass into the section 8, where they are treated with hot steam in a steam-treatment installation 205, then passing through a break roller mill, a vibrating sieve 207 and a flaking roller mill 208 to an oil extractor 209.

Figure 6:
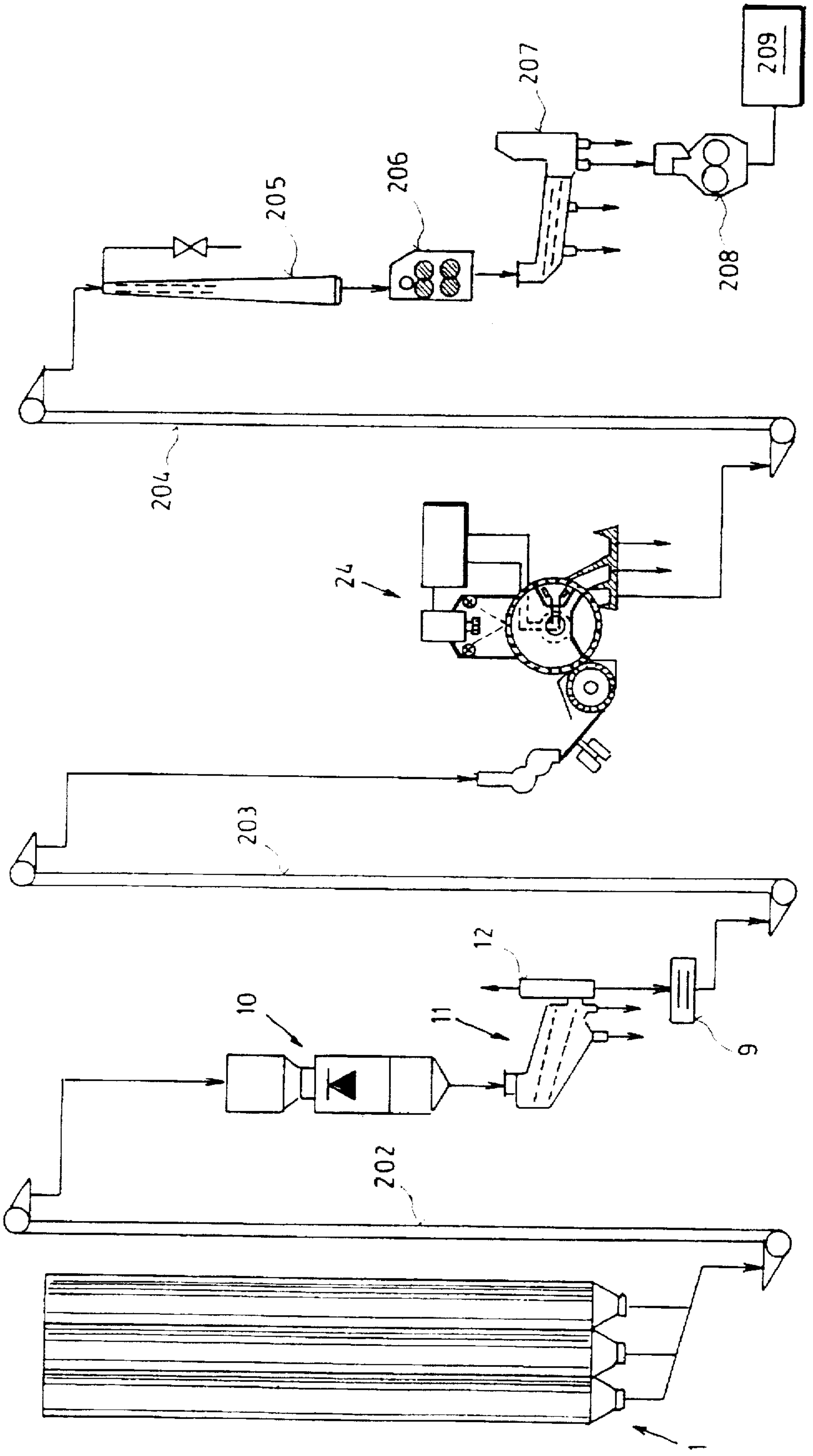
FIG. 6 soybean manufacture comprising an optical cleaning or sorting system.

According to FIG. 6, an optical sorting device 24 is provided by the invention for the treatment of soybeans for the first cleaning. It replaces the sieve-cleaning device 11a and the stone separator 17, as well as, if required, the slanted belt. impurities and broken particles of soybeans are detected on the basis of color and/or size and shape properties and are preferably thrown out separately. In addition, the possibility is provided to remove also the green and the unripe soybeans, whose proportion of bacteria is too great, by means of the optical sorting device 24 on the basis of the color and, if required, also the shape of the soybeans. Thereby, white flakes are obtained after the flocking, which can also be used for the manufacture of TVP (textured vegetable protein) for human nutrition purposes.

Figure 7:
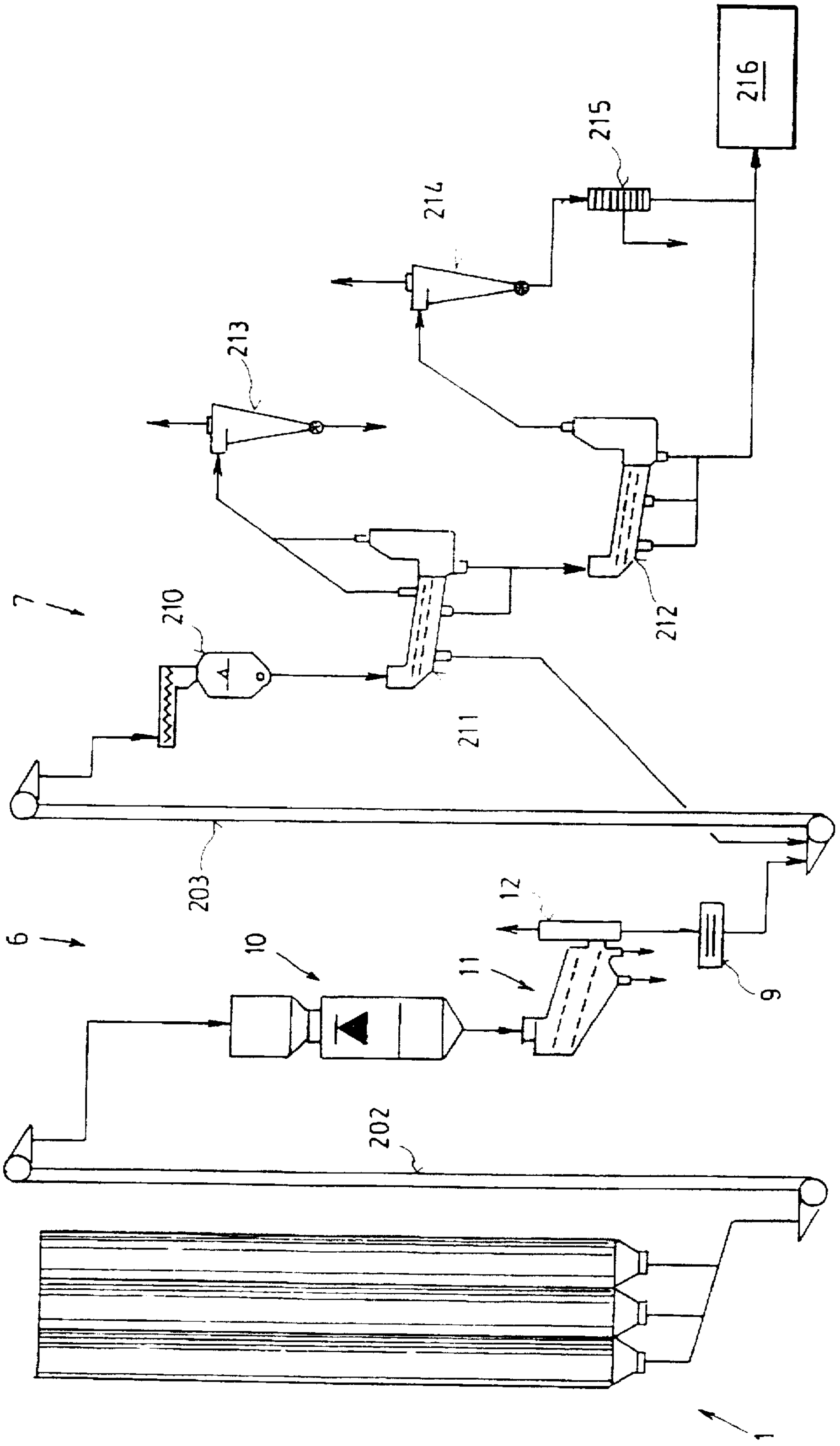
Fig. 7 PRIOR ART
FIG. 7 sunflower seeds manufacture according to the prior art.

FIG. 7 schematically shows the treatment of sunflower seeds according to the prior art. The bins and the precleaning in the section 6 are the same as in the treatment of soybeans. The first cleaning succeeding this arrangement for removing impurities and husk particles is preferably provided after a husking step in a centrifugal huller 210. In the centrifugal huller 210 there develops a mixture of husks and of husked and unhusked kernels. By means of a first vibratory sieve device 211 and an aspiration device 213 it is attempted to carry out a classification into unhusked grains, husked grains and husks. A first fraction with the unhusked grains constitutes about 17% of the whole amount of bulk material, being composed of about 40% unhusked and 60% husked kernels. Via the elevator 203, this fraction again passes to the centrifugal huller 210. The bad separating efficiency entails a great strain on the centrifugal huller 210 by returned husked kernels. A share of the husks is eliminated as second fraction via the aspiration device 213. A third fraction composed of husked kernels and husks is supplied to a second vibratory sieve device 212 having a second aspiration device 214. The kernel particles passing into the aspiration device together with the husks will then be separated as well as possible from the husks by means of plansifters 215.

The kernels from the second sieve device 212 and the kernel particles from the plansifters 215 pass into a treatment device 216 preferably comprising flocking roller mills and a pressing device.

Figure 8:
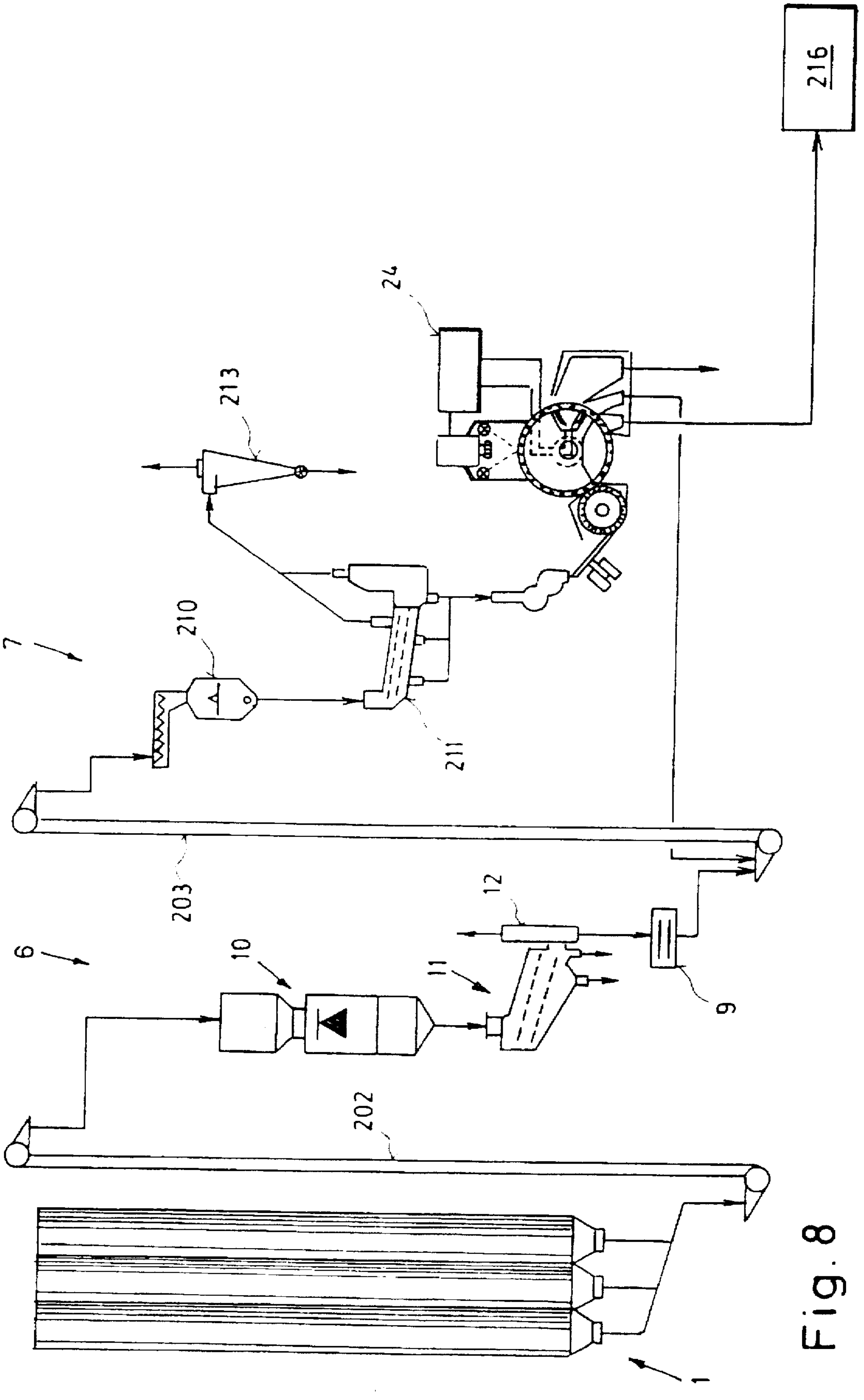
FIG. 8 sunflower seeds manufacture comprising an optical cleaning system.

FIG. 8 provides that a method in accordance with the invention for treating oil seeds, particularly sunflower seeds, comprises an optical sorting carried out by means of an optical sorting device 24 for the first cleaning. Subsequent to the centrifugal huller 210 there is provided a device for removing husks, preferably a vibrating sieve device 211 having an aspiration device 213. The optical sorting device partitions the bulk material freed from a part of the husks into unhusked kernels, husked kernels and kernel particles and husks by means of color and/or size and/or shape information. If required, the sorting device 24 comprises a video camera system 34 having two or more cameras delivering information from different perspectives. The evaluation of this image information provides a size and/or shape information for each particle, so that, for example, husks and kernels can be distinguished on the basis of different thicknesses. If the sorting device 24 should have a very high expelling capacity, the pre-classification by means of the vibrating sieve device 211 may be omitted, if required. A substantial advantage of the optical sorting is the sharp grading into the desired classes. The fraction with the unhusked kernels substantially includes neither husks nor unhusked kernels, so that the centrigugal huller 210 is not unnecessarily loaded by husked kernels, thus achieving a higher product throughput together with the same efficiency.

Figure 9:
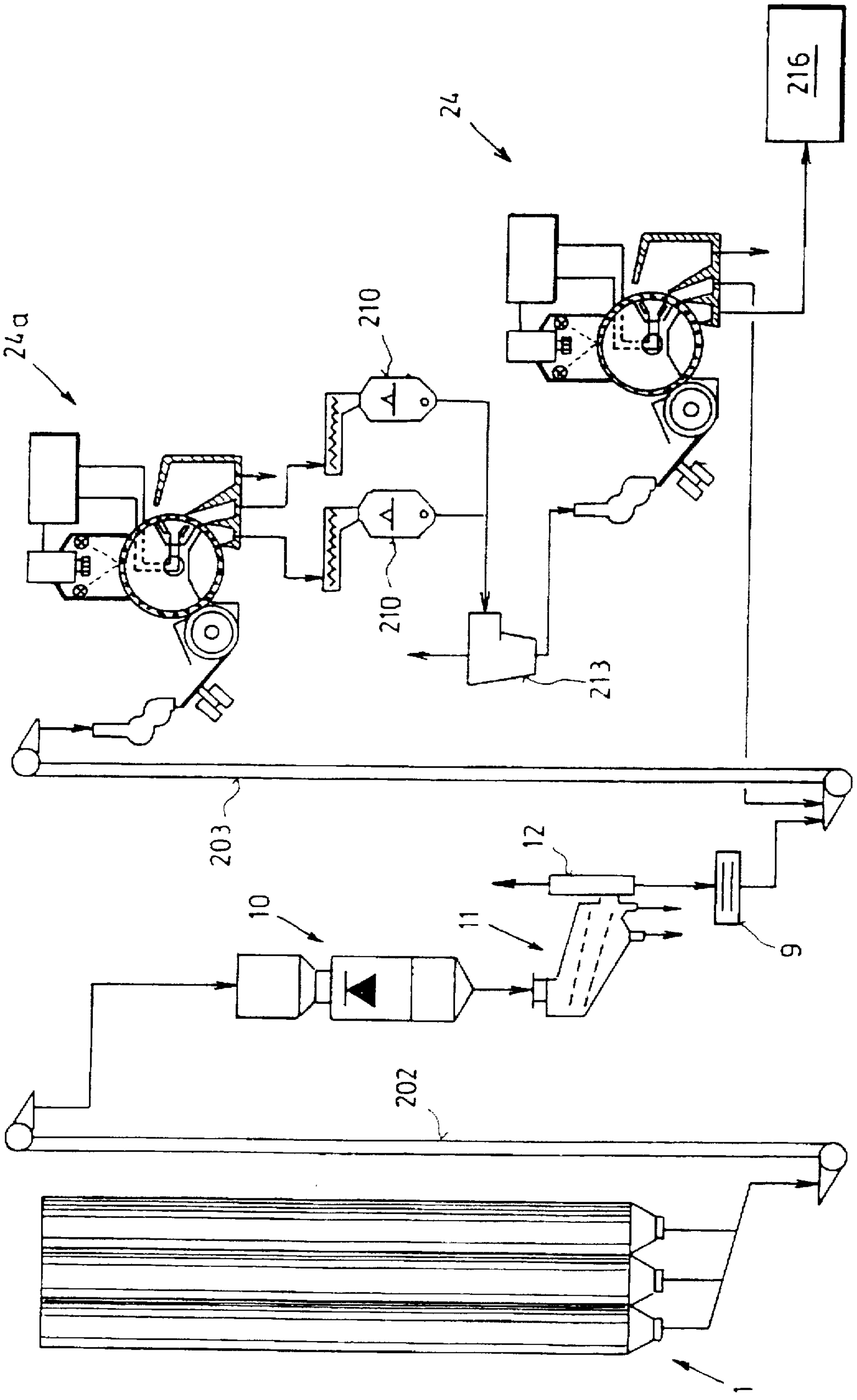
FIG. 9 sunflower seeds manufacture comprising an optical separation system of the flow of material prior to removing the husks.

To optimize the first cleaning in the treatment of sunflower seeds, the embodiment according to FIG. 9 provides a first optical sorting device 24*a* already before the centrifugal hullers 210. With the help of this sorting device, the product stream is to be partitioned into two partial streams having kernels of different sizes by means of size properties to be determined, such as length and/or width and/or size of the cross-sectional plane or the plane of projection. These partial streams are husked in the centrifugal hullers 210 adjusted to the respective particle sizes. Owing to this individualized adjustment, both the breaking up into too small particles and too great a share of unhusked kernels can be avoided. The succeeding aspiration device 213 partitions off a great part of the husks, so that the classification in a second optical sorter 24 does not have to expel an unnecessarily large amount of husk particles. The unhusked kernels are supplied back to the first sorting device via the elevator 203. Apart from the optimized husking procedure, the first optical sorting device 24*a* has the further advantage that also the sorting of impurities, such as stones, light bodies, weed seeds and the like, will be possible.

Figure 10:
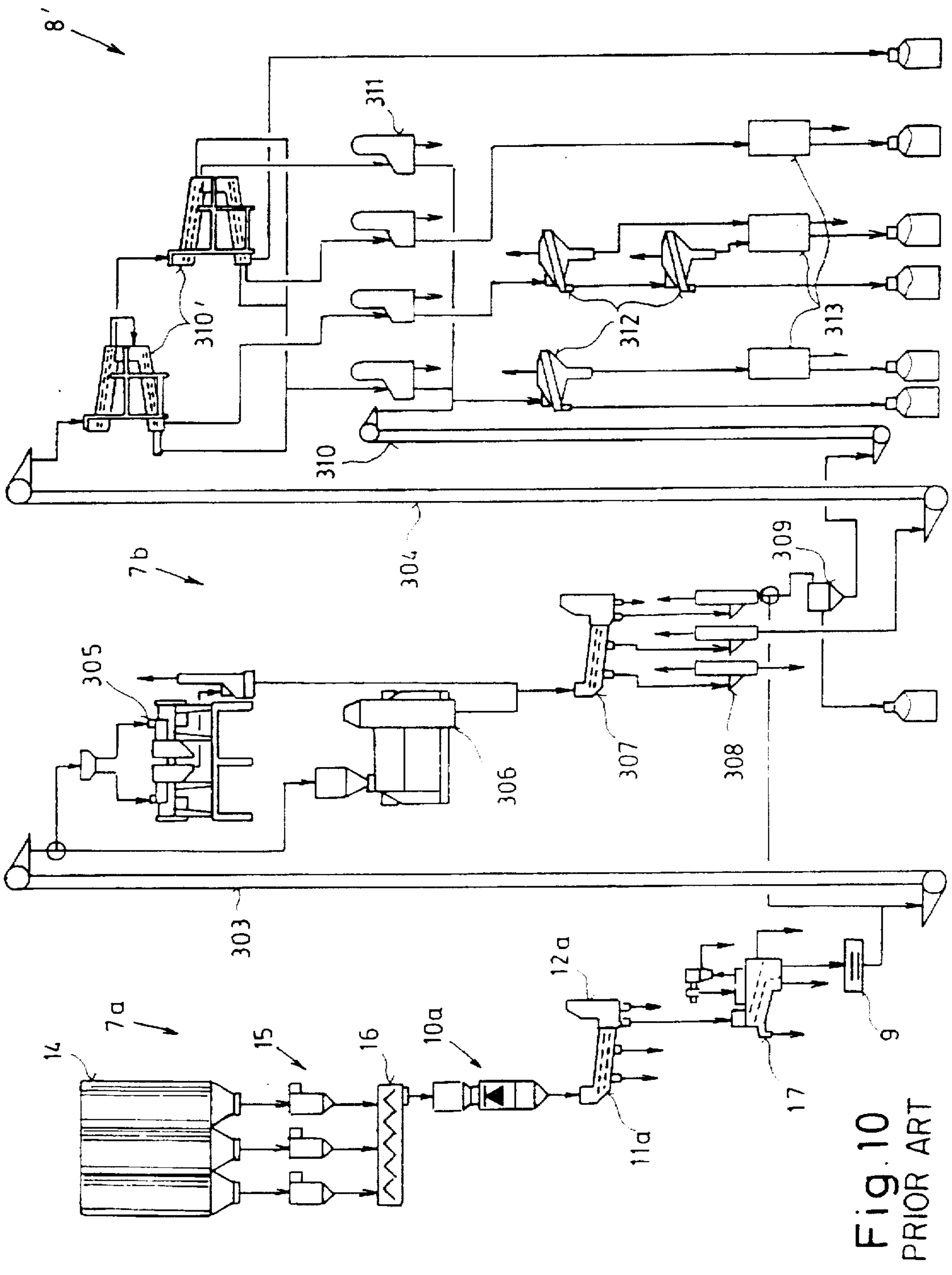
Fig.10 PRIOR ART
FIG. 10 coffee treatment according to the prior art.

FIG. 10 shows a known installation for cleaning, husking and classifying coffee beans. In a first section 7*a* of the first cleaning, dried coffee berries or Pergamino coffee pass into a sieve classification device 11*a* having an aspiration device 12*a* from product bins 14 via flow governors 15, a conveyor 16 and scales 10*a*. In the classification device 11*a*, 12*a* coarse, extremely fine and light impurities are sorted out of the coffee. In the succeeding dry stone separator 17, there are eliminiated impurities having the size of the coffee beans, but being of a higher weight and, if required, also impurities of a smaller weight. Via a magnetic separator 9 and an elevator 302, the dried coffee berries reach a husking device 305, and the Pergamino coffee passes into a polishing device 306. The partitioning of the husked or polished bulk material into three fractions, i.e. substantially husks, husked and unhusked coffee, takes place in a vibrating sieve 307 and in wind sifters 308. The fraction with the unhusked coffee can be supplied back to the husking device 305 via the elevator 303. In the case of a small unhusked share, preferably when treating Pergamino coffee, a class of Pergamino coffee in a drum sieve 309 is already fed into a container, and the remainder is supplied to a classification range (8') via an elevator 310. In the case of coffee berries, a fraction with unhusked coffee beans is led to the husking device 305 via an elevator 303, if required.

The husked or polished coffee beans pass into a sorting section via an elevator 304, in which the beans are partitioned into different size classes and cleaned from broken particles by means of vibrating sieve devices 310' and aspirational classification devices 311. In a further treatment step, infested, deformed and degenerated beans as well as small coffee berries and small Pergamino coffee beans are sorted out by means of specific gravity separators 312. In a last step, there are eliminated mainly black beans, which are undesired because of their color.

Figure 11:
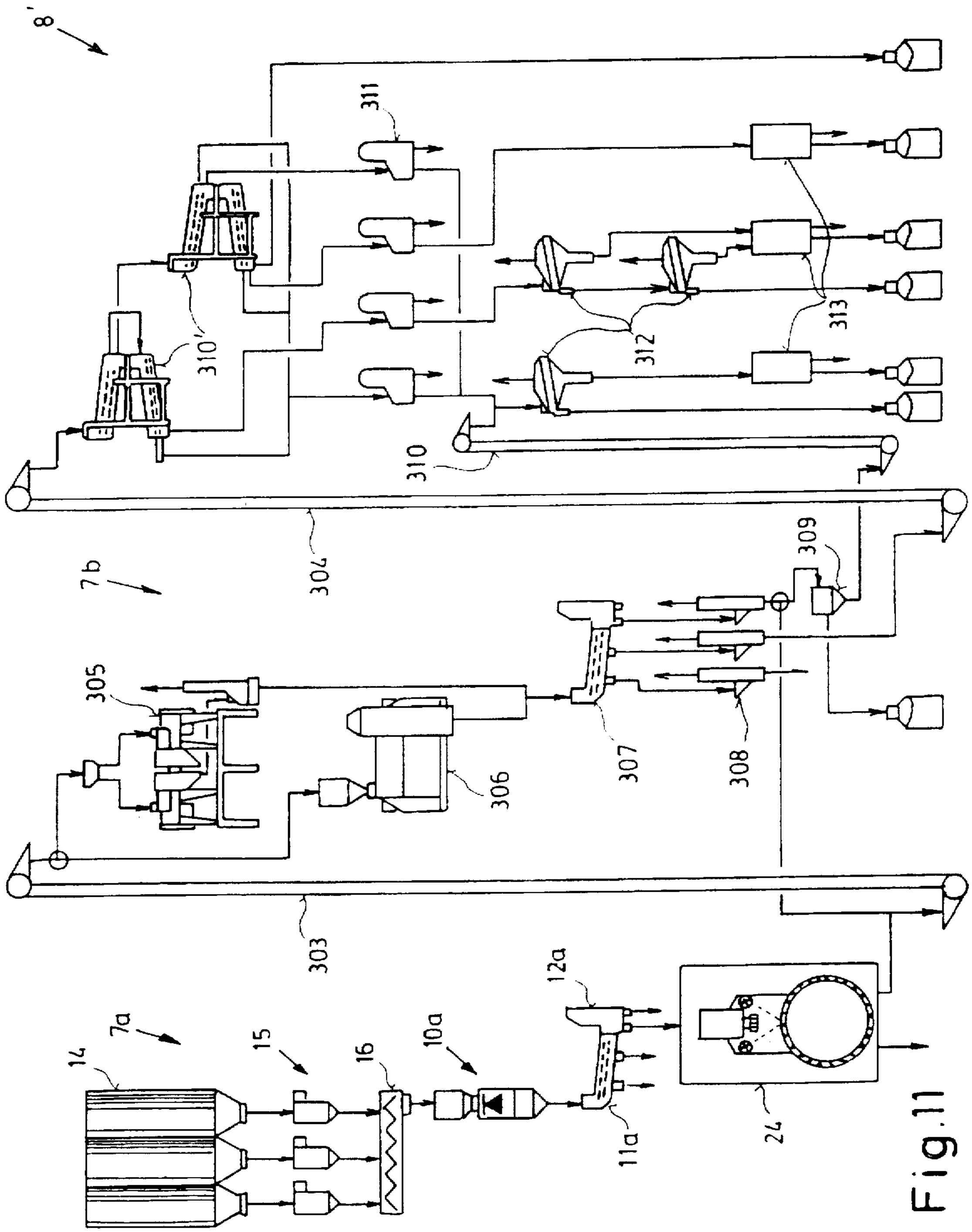
FIG. 11 coffee treatment comprising an optical cleaning system.

FIG. 11 illustrates how the first cleaning is optimized by the use of an optical sorting device 24 replacing the dry stone separator 17. Owing to color and/or size and/or shape properties clearly separating the coffee beans from possible contaminations, the optical sorting device cannot only sort out impurities of greater densities and sizes differing from the ones of the coffee beans, but it can do so with substantially all impurities. A huller, arranged after the optical sorting device, separates the coffee beans from their hull part.

If necessary, the coffee berries are partitioned into two size classes in addition to being cleaned, which size classes pass into optimally adjusted husking devices in a separate arrangement. To enable this optimization of the husking procedure, two husking lines or intermediate storage cells are to be provided.

Figure 12:
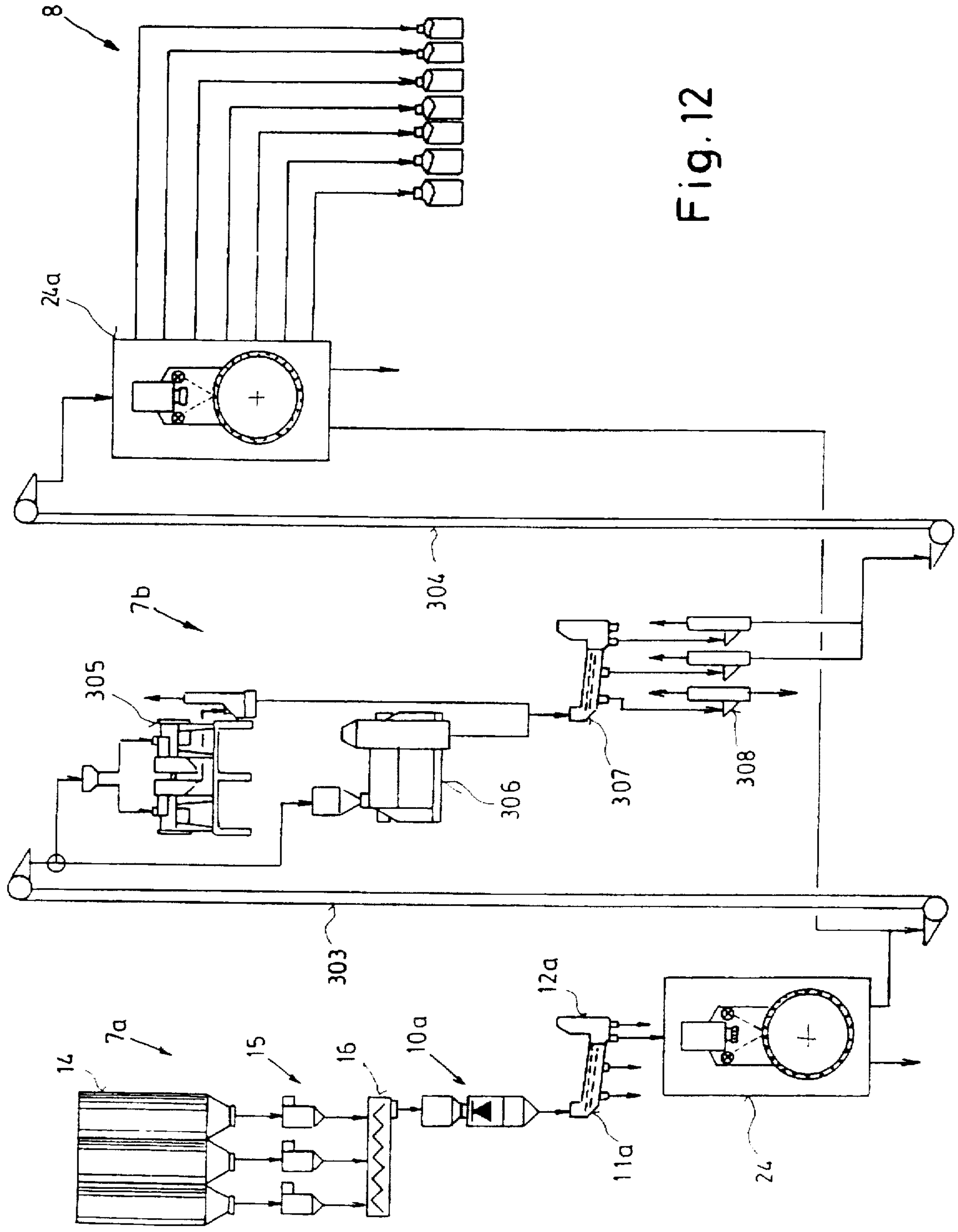
FIG. 12 coffee treatment comprising an optical cleaning and classification system.

According to FIG. 12, there is provided at least one second, if required, even a third sorting device 24*a* in order to sort out discolored (e.g. black beans) infested, deformed, broken, degenerated, small coffee berries and small Pergamino coffee beans from the husked or polished coffee beans by means of color and/or size and/or shape properties, and in order to partition the good coffee beans into different size classes. A third sorting device will be required when the second one cannot separate all the bean classes required. The sorting out of the undesired share of coffee conveniently represents the second part of the first cleaning. According to the prior art, this first cleaning step has been carried out substantially only after the classification of the beans and, therefore, had to take place separately for different product classes and with great expenses for specific gravity separators 312 and color sorting devices 313. Owing to the use of the second and, if required, of the third optical sorting device 24*a*, the cleaning step and the classification can be carried out optimally in a functional respect. The optical classification of the beans thereby replaces the vibrating sieve devices 310', the aspirational classification devices 311, the specific gravity devices 312 and the color sorting devices 313 employed according to the prior art, which corresponds to a substantially lower expenditure of equipment, space and energy.

It should be understood that procedure steps according to the invention for the first cleaning of all foodstuffs in the form of bulk material can be provided analogous to the examples represented. The respective precleaning or the further treatment is designed according to the respective incoming or outgoing products.

Figure 13:
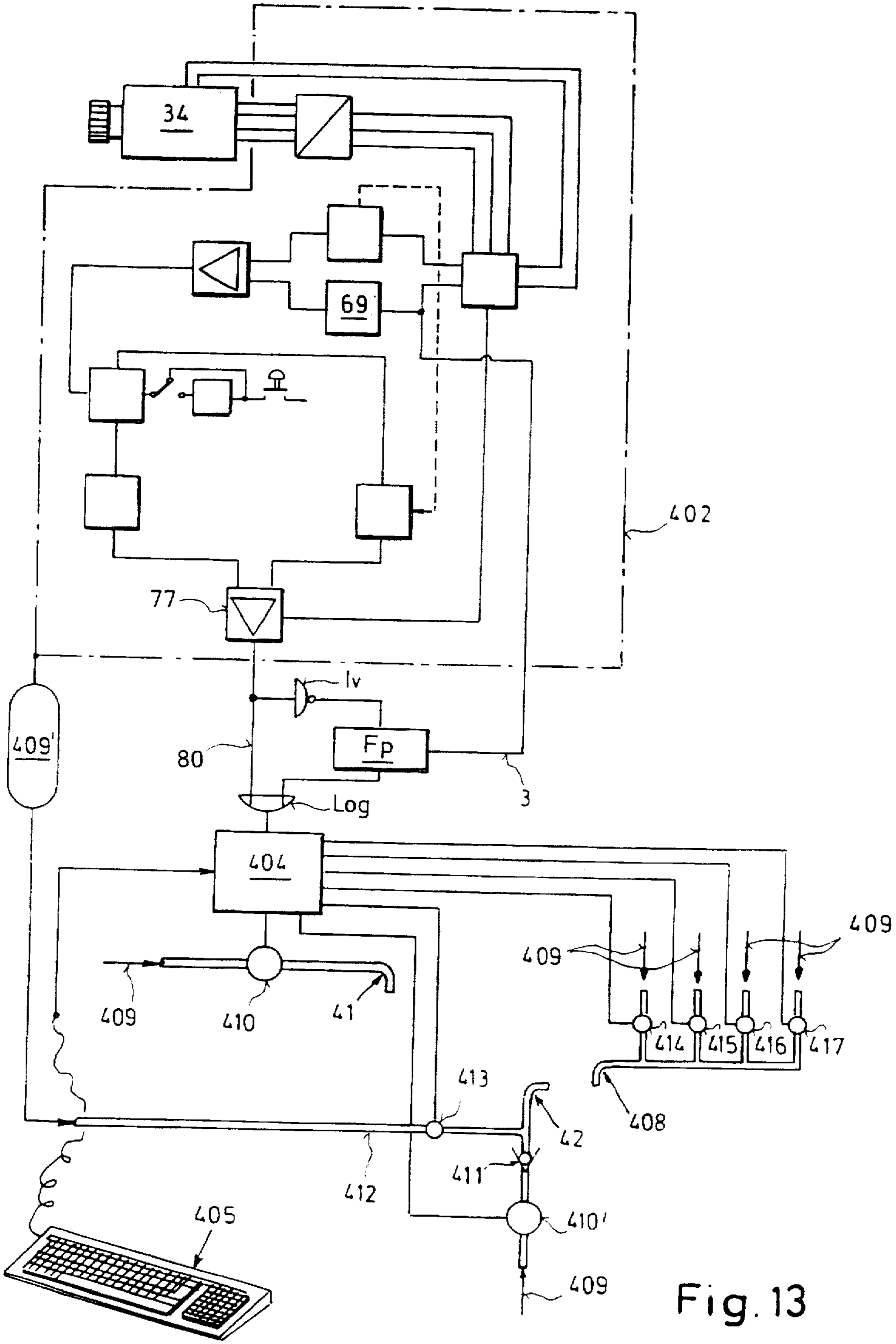
FIG. 13 a particularly preferred embodiment of a sorting device according to the invention.

In FIG. 13, there is schematically represented a sorting device comprising the video camera 34, which is connected to the color evaluation circuitry (cf. FIG. 2) designated by 402. As can be seen later on, this device is especially suited for sorting out particles of greatly differing masses, such as they occur particularly in the cleaning or, if required, in the precleaning phases, by means of respectively adapted expelling energies. Nevertheless, it should also be understood that such a device can also be used advantageously for other fields of the sorting technology.

Basically there is carried out a color comparison of the individual particles in the color evaluation circuitry 402 by means of a nominal pattern, whose result is provided or can be read off as output signal via the line 80. This color evaluation circuitry 402 corresponds to the drawing and description of EP-A-0 475 121, the entire contents of which are incorporated herein by reference.

Another component of the known circuitry is the shape processor Fp, which is connected to an inverting stage IV via the line 80 such that it is put into operation after the release of the corresponding signals from the output stage 77 of the color evaluation circuitry 402 for determining shape or size. For this purpose, the shape processor Fp receives the video signal via a line 403, which video signal is also supplied to the stage 69 for the color processing. From the detection of the contours and the corresponding calculations of area the shape and size of the individual particle will then be determined. The respective information is then supplied to a processor or a computing unit 404 via an OR logic Log, by way of example, which calculates the intensity of the sorting energy on the basis of the information received, which value is required for the individual particle on the basis of its mass and/or its shape. For the shape, too, will determine the trajectory generated inasmuch as it influences the flow resistance of the air. Via an input device 405, the sorting energy required in each case for a particular particle type can be fed into the computing unit 404 via an input device 405, with this input possibly being determined by the installation of reception containers for the particles that have been sorted out or by the place of installation of which.

In the drawing, the air blast nozzles 41, 42 and 408 are represented as actuating units, which, however, do not necessarily have to be realized. Rather there are represented various conceivable embodiments on the basis of these air blast nozzles 41, 42 and 408, which can be realized alternatively or cumulatively.

Thus, the computing unit 404 controls a proportional valve 410 in the case of the air blast nozzle 41, which is fed by an air supply system (e.g. a blower) merely represented by an arrow 409, due to which proportional valve 410 the intensity and/or the duration of the air blast led through the nozzle 41 can be influenced.

While the valve 410 is generally controlled by an analog signal or by a digital signal changeable step by step, the control unit can be controlled in the case of the nozzle 42 such that it is connected to the air supply system 409 via a check valve 411. Behind this check valve there joins a line 412 leading to an air supply system in the form of an accumulator 409' known per se. The computing unit 404 now controls a valve 410', which entirely opens the passage from the air supply system 409 to the air blast nozzle 42 or closes it completely. If the calculation by the computing unit shows that the basic adjustment for the sorting energy given by the valve 410' should not be sufficient to expel a particle to be sorted out at a particular place, then the computing unit will additionally trigger a valve 413 connecting the nozzle 42 to the accumulator 409'. The valve 413 may be a valve which can be opened or closed digitally or a valve that can be put into different positions according to the desired design.

Finally, an embodiment as it is represented on the basis of the nozzle 408, will also be possible. In this arrangement, the air supply system 409 is connected to the air blast nozzle 408 via a plurality of pressure reducing valves 414, 415, 416 and 417, with each of these valves 414 to 417 being adjusted to a different pressure value.

Even though the use of air blast nozzles as actuating units is to be preferred, the invention will not be limited to such an arrangement, but it will be applicable in various manners to different types of actuating units, such as mechanical expellers, electrostatic expellers, and the like.

On the basis of color and shape, the computing unit 404 can also determine the kind of the object (e.g. a stone) and its specific weight, if required, to be able to determine the sorting energy thereafter. Furthermore, it is conceivable to carry out the sorting procedure merely on the basis of color or only according to shape and size. The invention makes it possible to reduce the expenses for actuating units and/or to sort particles of extreme mass differences without any difficulties.

What is claimed is:

1. A method for treating unhulled particulate food material containing impurities comprising the steps of:

precleaning said food material by removing impurities which differ distinctly from said particulate food material;

first cleaning for selecting still remaining impurities from the precleaned food material including a step of optically detecting at least one characteristic property selected from the group consisting of color, size and shape of particles of said unhulled particulate food material, said optically detecting step being accomplished subsequent to said precleaning step and prior to hulling of the unhulled particulate food material;

comparing said detected characteristic property with characteristics of acceptable particles of the food material; and partitioning said food material at least into impurities and acceptable particles of the food material, said partitioning step providing sorting results upon the particulate food material in accordance with detections made in said optically detecting step, wherein the particulate food material remains unhulled after said steps of first cleaning, optically detecting and partitioning; and wherein said optically detecting step comprises steps of establishing red, green and blue references against which color the particles of the food material are to be compared in said comparing step for a measurement of color, establishing coordinate dimensions of length and width against which size the particles of the food material are to be compared in said comparing step, and introducing a learning procedure with reference to shapes against which the particles of the food material are to be compared from measurement of shape in said comparing step.

2. Method as claimed in claim 1, wherein said optically detecting includes the steps of:

presenting the food material to at least one optoelectronic sensor;

outputting an output signal for classifying each particle of said food material; and processing of said output signal for deducing actual parameters of characteristic properties of each particle.

3. Method as claimed in claim 2, wherein said optoelectric sensor is a color television camera.

4. Method as claimed in claim 2, wherein said optoelectric sensor is a CCD camera.

5. Method as claimed in claim 2, wherein said optoelectric sensor is a diode array camera.

6. Method as claimed in claim 1, wherein said comparing includes the step of allocating an actual parameter to a class of particles represented by at least one preset parameter and creating a control signal for controlling an automatic sorting step.

7. Method as claimed in claim 1, wherein said step of introducing a learning procedure comprises at least one learning step for deducing at least one preset parameter representative of a particle class, wherein said at least one preset parameter is deduced by analyzing the optically deduced characteristic of at least one particle.

8. Method as claimed in claim 1, wherein said establishing steps include at least one defining step for defining at least one preset parameter representative of a particle class.

9. Method as claimed in claim 8, wherein said defining step is used for size parameters.

10. Method as claimed in claim 1, wherein said at least one characteristic property is a particle size parameter.

11. Method as claimed in claim 10, wherein said size parameter is a value of length of a particle.

12. Method as claimed in claim 10, wherein said size parameter is a value of area of a particle.

13. Method as claimed in claim 1, wherein said at least one characteristic property is a particle shape parameter.

14. Method as claimed in claim 13, wherein said shape parameter is a static moment of the group consisting of first, second and third order static moments of a particle cross-section relative to a particle axis.

15. The method according to claim 1, wherein the particulate food material is coffee beans.

16. A method for treating unhulled particulate food material containing impurities comprising the steps of:

precleaning said food material by removing impurities which differ distinctly from said particulate food material;

first cleaning for selecting still remaining impurities from the precleaned food material including a step of optically detecting at least one characteristic property selected from the group consisting of color, size and shape of particles of said unhulled particulate food material, said optically detecting step being accomplished subsequent to said precleaning step and prior to hulling of the unhulled particulate food material;

comparing said detected characteristic property with characteristics of acceptable particles of the food material; and partitioning said food material at least into impurities and acceptable particles of the food material said partitioning step providing concurrently sorting functions upon the particulate food material in accordance with detections of said optically detecting step, wherein the particulate food material remains unhulled after said steps of first cleaning, optically detecting and partitioning; and wherein said optically detecting step comprises steps of establishing red, green and blue references against which color the particles of the food material are to be compared in said comparing step for a measurement of color, establishing coordinate dimensions of length and width against which size the particles of the food material are to be compared in said comparing step, and introducing a learning procedure with reference to shapes against which the particles of the food material are to be compared from measurement of shape in said comparing step.

17. The method according to claim 16, wherein the particulate food material is coffee beans.

18. A method for treating unhulled rice particles accompanied by impurities, comprising the steps of:

providing at least two classes of rice having different characteristics;

optically detecting at least characteristics of said rice and said impurities, said optical detecting step being accomplished prior to hulling of the unhulled rice particles and comprising color references against which said rice particles are compared by color measurement of said unhulled rice particles;

sorting said unhulled rice particles according to said optically detected characteristics into at least a first portion and a second portion;

providing bin means for separating each of said portions and conveying each of said first and second portions of the unhulled rice particles into a respective bin means, wherein the rice particles remain unhulled after said steps of optically detecting and sorting; and providing means for dehulling and subsequently conveying only one of said portions of unhulled rice from its respective bin means to said dehulling means.

* * * * *